United States Patent
Fedetto et al.

(10) Patent No.: US 10,342,250 B2
(45) Date of Patent: Jul. 9, 2019

(54) SYSTEM AND METHOD FOR CURING TOBACCO

(71) Applicant: Universal Leaf Tobacco Company, Inc., Richmond, VA (US)

(72) Inventors: Fabio Italo Paolo Fedetto, Richmond, VA (US); Hanif Mahomed Mahomed, Richmond, VA (US)

(73) Assignee: UNIVERSAL LEAF TOBACCO COMPANY, INC., Richmond, VA (US)

( * ) Notice: Subject to any disclaimer, the term of this patent is extended or adjusted under 35 U.S.C. 154(b) by 378 days.

(21) Appl. No.: 15/387,371

(22) Filed: Dec. 21, 2016

(65) Prior Publication Data
US 2018/0168218 A1   Jun. 21, 2018

(51) Int. Cl.
| | |
|---|---|
| A42B 3/12 | (2006.01) |
| C10L 5/44 | (2006.01) |
| C10L 5/04 | (2006.01) |
| C10L 3/12 | (2006.01) |
| C10L 1/06 | (2006.01) |
| C10L 1/02 | (2006.01) |
| A24B 3/12 | (2006.01) |
| A24B 1/02 | (2006.01) |

(52) U.S. Cl.
CPC .................. *A24B 3/12* (2013.01); *A24B 1/02* (2013.01); *C10L 1/02* (2013.01); *C10L 1/06* (2013.01); *F26B 2200/22* (2013.01); *Y02E 50/10* (2013.01); *Y02E 50/30* (2013.01)

(58) Field of Classification Search
None
See application file for complete search history.

(56) References Cited

U.S. PATENT DOCUMENTS 3,910,757 A * 10/1975 Taylor .................... A24B 1/02
                                                          296/100.06
4,123,221 A    10/1978 Danford
(Continued)

FOREIGN PATENT DOCUMENTS

CN          101843358 A       9/2010

OTHER PUBLICATIONS

Extended European Search Report EP Application No. 17157803.2 dated Sep. 21, 2017.
(Continued)

*Primary Examiner* — Dennis R Cordray
(74) *Attorney, Agent, or Firm* — Pillsbury Winthrop Shaw Pittman LLP

(57) ABSTRACT

A system and method for curing or drying tobacco leaves are described herein. The method includes flowing a first combustion gas generated by a first heat source through a first flue pipe provided inside a first barn to heat air inside the first barn to cure a first batch of tobacco leaves disposed inside the first barn; transferring at least a portion of the first combustion gas generated by the first heat source to a second flue pipe provided inside a second barn adjacent the first barn to heat the second barn and start curing a second batch of tobacco leaves disposed inside the second barn; and flowing second combustion gas generated by a second heat source through the second flue pipe to continue curing the second batch of tobacco leaves after the second barn is heated.

21 Claims, 21 Drawing Sheets

(56) References Cited

U.S. PATENT DOCUMENTS

| | | | | |
|---|---|---|---|---|
| 4,206,554 | A | * | 6/1980 | Fowler .................... A24B 1/02 131/302 |
| 4,263,721 | A | | 4/1981 | Danford |
| 4,267,645 | A | | 5/1981 | Hill |
| 4,424,024 | A | * | 1/1984 | Wilson .................... A24B 1/02 110/205 |
| 4,499,911 | A | | 2/1985 | Johnson |
| 5,018,281 | A | * | 5/1991 | Bulluck, Jr. ............. A24B 1/02 165/166 |
| 5,685,710 | A | | 11/1997 | Martinez Sagrera et al. |
| 8,151,804 | B2 | | 4/2012 | Williams |
| 2006/0168842 | A1 | | 8/2006 | Sprague |

OTHER PUBLICATIONS

International Search Report & Written Opinion of the International Searching Authority PCT/IB2017/051148 dated Jun. 16, 2017.
Office Action Bangladesh Patent Application No. 58/2017 dated Jun. 5, 2018.

* cited by examiner

SYSTEM AND METHOD FOR CURING TOBACCO

BACKGROUND OF THE INVENTION

Field of the Invention

The present invention pertains to a system and method for curing tobacco leaves in general and, in particular to a system and method for curing tobacco leaves by circulating or flowing combustion gas from a combustible heat source.

Discussion of Related Art

Tobacco leaves are collected by growers and are cured and dried in barns using a heat source or fuel, such as wood, biomass, coal, a combination of two or more thereof, or by burning a gas (e.g., Liquefied Petroleum Gas). A circulating flue pipe is arranged in a barn for circulating hot combustion gases from the heat source. Heat from the combustion gases is transferred to the air inside the barn through heat transfer or conduction via the walls of the flue pipe. Tobacco leaves are hung inside the barn so as to cure and dry the leaves and remove moisture from the tobacco leaves using the heat from the hot combustion gases. In conventional tobacco curing barns, the combustion gases that flow inside the flue pipe within the barn are typically exhausted directly into atmosphere outside the barn. As a result, heat from the gases exhausted to the outside atmosphere is wasted.

The present method and system described herein provides an improved system and method for more efficiently curing and drying tobacco.

BRIEF SUMMARY OF THE INVENTION

An aspect of the present disclosure is to provide a system for curing and drying tobacco leaves. The system includes a first barn configured for housing tobacco leaves, the first barn having a first heat source and a first flue pipe for transporting first combustion gases generated by a combustion of fuel in the first heat source, the first flue pipe carrying the first combustion gases being configured to heat air inside the first barn to cure the tobacco leaves housed inside the first barn. The system further includes a second barn configured for housing tobacco leaves, the second barn having a second heat source and a second flue pipe for transporting second combustion gases generated by a combustion of fuel in the second heat source, the second flue pipe carrying the second combustion gases being configured to heat air inside the second barn to cure the tobacco leaves housed inside the second barn. The system also includes a connecting flue pipe configured and arranged to connect the first flue pipe inside the first barn to the second flue pipe inside the second barn. The connecting flue pipe is configured to transfer at least a portion of the first combustion gases generated by the first heat source into the second flue pipe to heat the air inside the second barn prior to combustion of fuel in the second heat source. The term "curing tobacco leaves" is used herein to encompass a variety of chemical and physical changes that occur in the tobacco leaves during a curing process which includes drying the tobacco leaves.

Another aspect of the present disclosure is to provide a method for curing and drying tobacco leaves. The method includes flowing first combustion gas generated by a first heat source through a first flue pipe provided inside a first barn to heat air inside the first barn to cure a first batch of tobacco leaves disposed inside the first barn; transferring at least a portion of the first combustion gas generated by the first heat source to a second flue pipe provided inside a second barn adjacent the first barn to heat the second barn and start curing a second batch of tobacco leaves disposed inside the second barn; and flowing second combustion gas generated by a second heat source through the second flue pipe to continue curing the second batch of tobacco leaves after the second barn is heated.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the disclosure, the structural components illustrated herein are drawn to scale. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

DETAILED DESCRIPTION OF EMBODIMENTS OF THE INVENTION

Figure 1A:
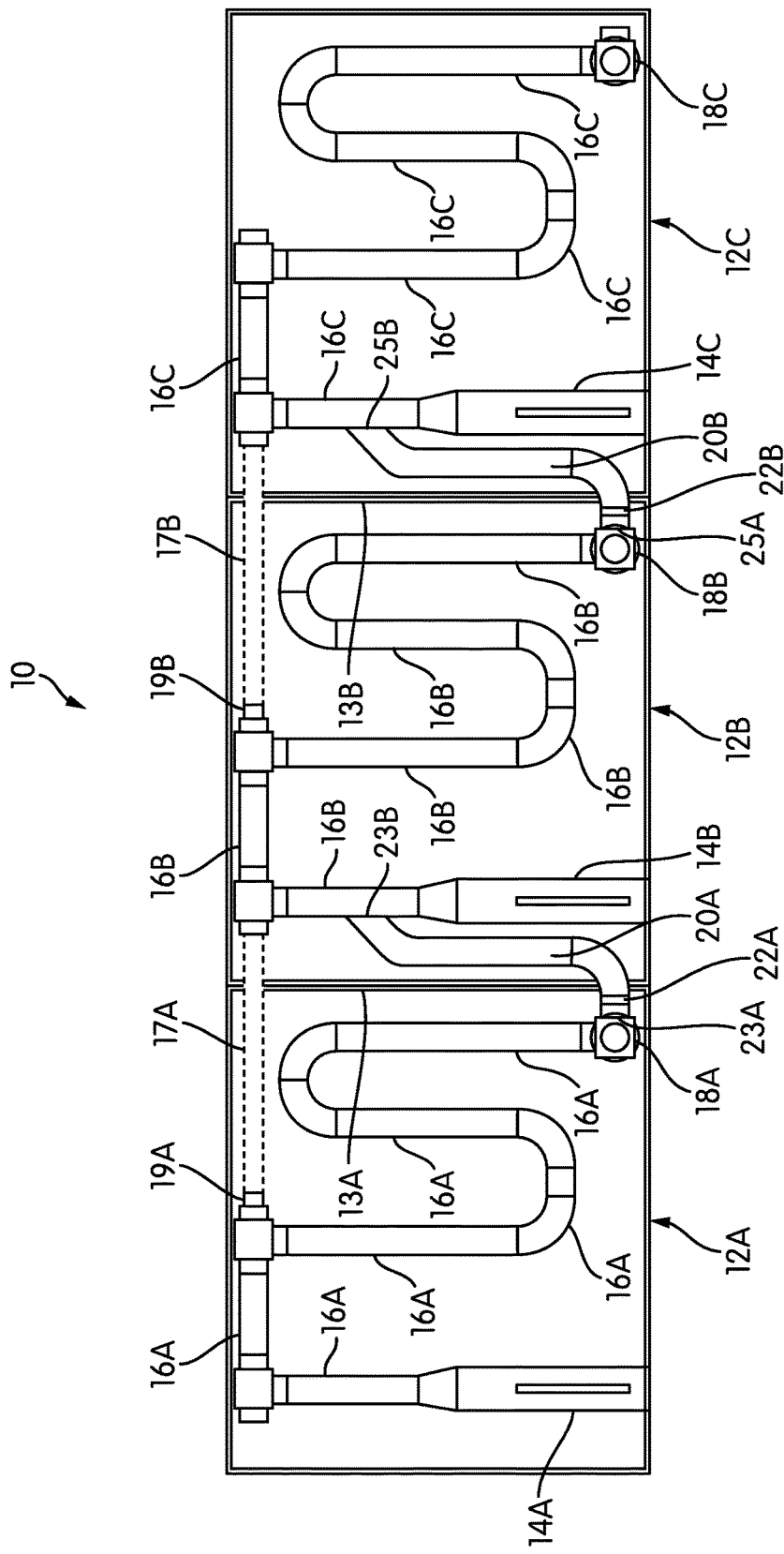
FIGS. 1A-1G are plan views of a system for drying and curing tobacco leaves, according to an embodiment of the present disclosure.

FIGS. 1A-1G are plan views of a system for drying or curing tobacco leaves, according to an embodiment of the present disclosure. As shown for example in FIG. 1A, in an embodiment, the system for drying or curing tobacco leaves 10 includes a plurality of chambers, housings or barns 12A, 12B and 12C configured for housing or receiving tobacco leaves (not shown). For example, tobacco leaves can be hung on racks, strings, clips, tier poles, etc. provided inside the barns 12A, 12B, 12C, as is conventionally known. Inside each of the barns 12A, 12B and 12C is provided a heat source 14A, 14B and 14C, respectively. The heat source 14A, 14B, 14C can be any type of heat source including a fuel combustion heat source such as a furnace, the fuel being selected from the group consisting of wood, biomass, coal, a liquefied petroleum gas (LPG), a liquefied natural gas (LNG), gasoline, alcohol, or any other combustible material, or any combination of two or more thereof. In an embodiment, when using LPG, LNG, wood or other fuels, the heat source can be provided with a Venturi system. The Venturi system allows for a portion of the hot flue combustion gases that would normally be exhausted to be recirculated through the flue pipes thus improving fuel usage efficiency.

The hot combustion gases generated by the combustion of the fuel (e.g., wood, biomass, gas, etc.) in the heat sources 14A, 14B, 14C moves through flue pipes 16A, 16B and 16C, respectively. Flue pipes 16A are arranged in serpentine or meandering fashion inside barn 12A, flue pipes 16B are arranged in serpentine or meandering fashion inside barn 12B, and flue pipes 16C are arranged in serpentine or meandering fashion inside barn 12C. The hot combustion gases flowing through the flue pipes 16A, 16B, and 16C heat the walls of the flue pipes. The heat is transmitted by conduction through the walls of the flue pipes 16A, 16B and 16C to the air surrounding the flue pipes 16A, 16B, 16C. In an embodiment, flue pipes 16A in barn 12A, flue pipes 16B in barn 12B and flue pipes 16C in barn 12C are arranged at a lower portion of the barns 12A, 12B and 12C, closer to the floor of the barns 12A, 12B and 12C so that hot air heated by conduction through the wall of flue pipes 12A, 12B and 12C raises by heat convection to come in contact with tobacco leaves hung above the flue pipes 16A, 16B and 16C. Exhaust ports 18A, 18B, 18C are also provided at an end of flue pipes 16A, 16B and 16C, respectively. The exhaust ports 18A, 18B and 18C are configured to exhaust the combustion gases generated by the combustion of the fuel in the heat sources 14A, 14B and 14C into the atmosphere outside of the barns 12A, 12B and 12C. Therefore, the flue pipes 16A, 16B and 16C carrying hot combustion gas generated by the combustion of the fuel in the heat sources 14A, 14B and 14C, respectively, are configured to heat the air inside the barns 12A, 12B and 12C, respectively, to dry or cure the tobacco leaves housed inside the respective barns 12A, 12B and 12C.

In addition to flue pipes 16A, 16B and 16C provided inside of each barn 12A, 12B and 12C, respectively, the system 10 further includes connecting flue pipe 20A that connects the flue pipes 16A in barn 12A with the flue pipes 16B in barn 12B and connecting flue pipe 20B that connects the flue pipes 16B in barn 12B with flue pipes 16C in barn 12C. In an embodiment, the connecting flue pipe 20A is provided inside barn 12B and the connecting flue pipe 20B is provided inside barn 12C. In an embodiment, as shown in FIG. 1A, a gate, register or damper 22A is provided at a junction 23A between the flue pipes 16A and the connecting flue pipe 20A. Similarly, a gate, register or damper 22B is provided at a junction 25A between the flue pipes 16B and the connecting flue pipe 20B. In an embodiment, the gate 22A is provided within barn 12A and gate 22B is provided within barn 12B. However, as it can be appreciated, the gate 22A can be provided at any location within the connecting pipe 20A, for example at an end 23B of connecting pipe 20A that connects to flue pipes 16B within barn 12B. Similarly, as it can be appreciated, the gate 22B can be provided at any location within the connecting pipe 20B, for example at an end 25B of connecting pipe 20B that connects to flue pipes 16C within barn 12C.

The register or damper 22A controls a flow of combustion gases from the flue pipes 16A to connecting flue pipe 20A. The register or damper 22B controls a flow of combustion gases from the flue pipes 16B to connecting flue pipe 20B. When the gate 22A is opened and the exhaust port 18A is closed, the combustion gas flowing inside the flue pipes 16A within barn 12A is redirected and allowed to flow through the open gate 22A into the connecting flue pipe 20A and then into the flue pipes 16B inside barn 12B. Similarly, when the gate 22B is opened and the exhaust port 18B is closed, the combustion gas flowing inside the flue pipes 16B within barn 12B is redirected and allowed to flow through the open gate 22B into the connecting flue pipe 20B and then into the flue pipes 16C inside barn 12B. As it can be appreciated, the gate 22A and the gate 22B can also be configured to be adjustable so as to allow a portion of the combustion gases to be redirected to flow into the connecting flue pipe 20A, 20B while allowing another portion of the combustion gases to exhaust to the outside atmosphere through exhaust ports 18A, 18B.

In an embodiment, as illustrated in FIG. 1A, the barn 12A and the adjacent barn 12B share a common wall 13A and the barn 12B and the adjacent barn 12C share a common wall 13B. For example, by providing a common wall 13A between the adjacent barns 12A and 12B and/or a common wall 13B between adjacent barns 12B and 12C manufacturing costs of the barns 12A, 12B and 12C can be reduced. Furthermore, by providing common walls 13A and 13B, a length of connecting flue pipe 20A and/or connecting flue pipe 20B can be housed wholly inside the barn 12A, 12B and 12C, thus allowing to reduce heat dissipation outside of the barns 12A, 12B and 12C and thus efficiently using the heat of the combustion gases inside the respective barns to dry tobacco leaves. Although the barns are shown to be arranged as having a common wall between two adjacent barns, as it can be appreciated the barns 12A, 12, 12C can also be separated from each other so that a gap is provided between two adjacent walls of two respective barns, if desired.

As it can be appreciated, the combustion gases circulating or flowing inside the flue pipes 16A, 16B, 16C and connecting flue pipes 20A and 20B do not come in contact with tobacco leaves. The hot combustion gases circulating within the flue pipes 16A, 16B, 16C, 20A, 20B heat the walls of the flue pipes. The hot walls of the flue pipes in turn heat the air within the various barns 12A, 12B and/or 12C through heat conduction. The hot air moves by heat convection to cure and dry tobacco leaves hung inside the barns 12A, 12B and/or 12C.

Figure 1B:
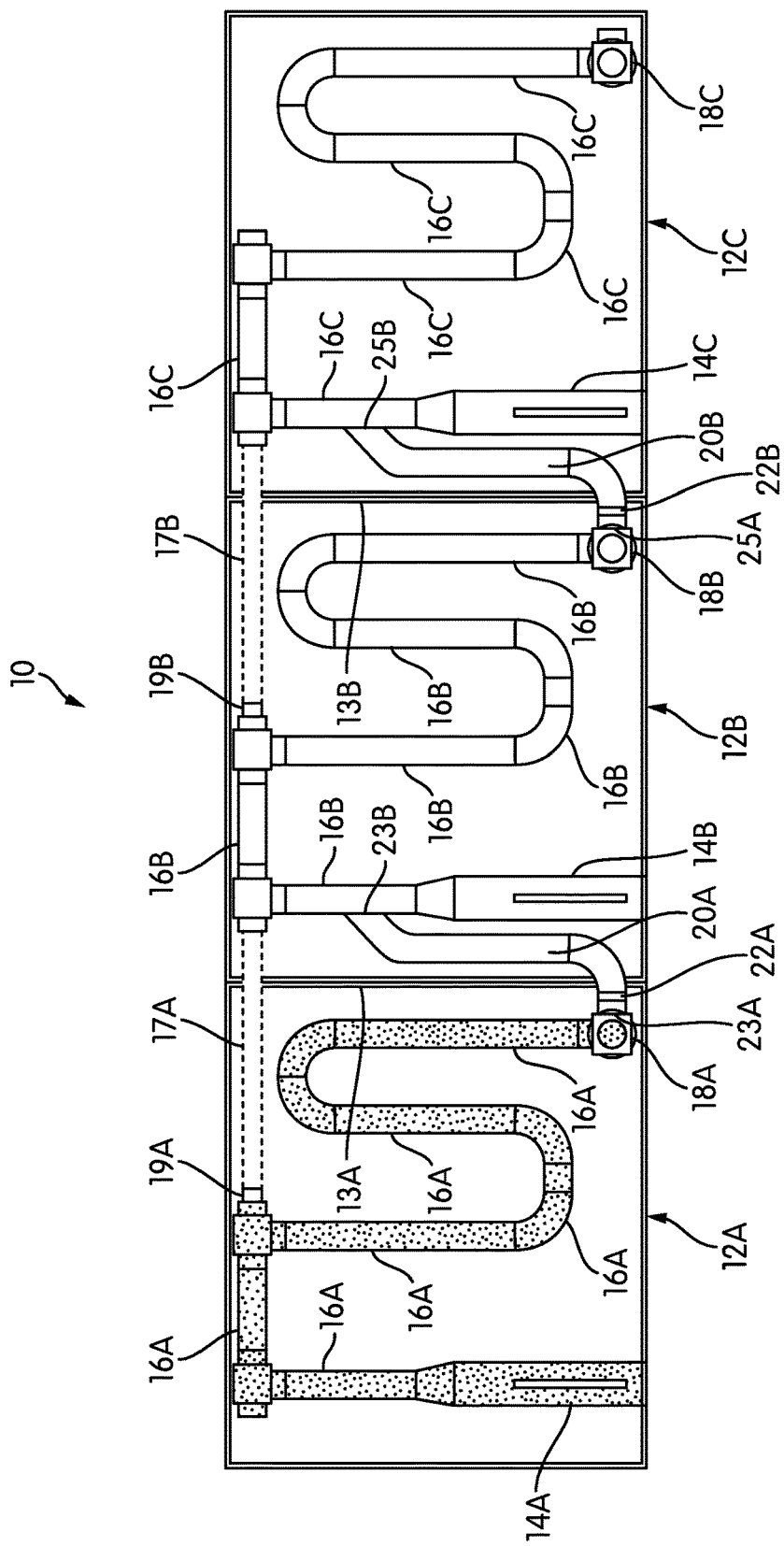

In the following paragraphs, the operation of the system 10 will be described in detail with reference to FIGS. 1A-1G. Initially, the barn 12A (a first barn) is filled with a first batch of tobacco leaves, before starting the heat source 14A, as illustrated in FIG. 1A. For example, the tobacco leaves can be hung on racks, clips, strings or placed on shelves, or the like inside the barn 12A. The heat source 14A (e.g., a furnace using wood, biomass, coal or gas such as LPG as fuel) is then started, as illustrated in FIG. 1B. Heat generated by the hot combustion gas generated by the combustion of the fuel in the heat source 14A flows through the flue pipes 16A and is used to heat the air inside the barn 12A to cure and dry the first batch of tobacco leaves hung inside the barn 12A, as illustrated in FIG. 1B. Heat generated by the hot combustion gas from the heat source 14A heats the walls of the flue pipes 16A. The heat from the walls of the flue pipes 16A is transmitted by conduction to the air surrounding the flue pipes 16A. The hot air then propagates via convection to contact the tobacco leaves to cure and dry the tobacco leaves (i.e., gradually remove the moisture within the tobacco leaves). After circulating or flowing through the flue pipes 16A inside the barn 12A, the combustion gases are allowed to exit through the exhaust port 18A (a first port) into the outside atmosphere, as illustrated in FIG. 1B. Therefore, the flue pipes 16A carrying the hot combustion gas generated by the combustion of the fuel in the heat source 14A is/are configured to heat the air inside the barn 12A to dry or cure the tobacco leaves housed inside the barn 12A.

Figure 1C:
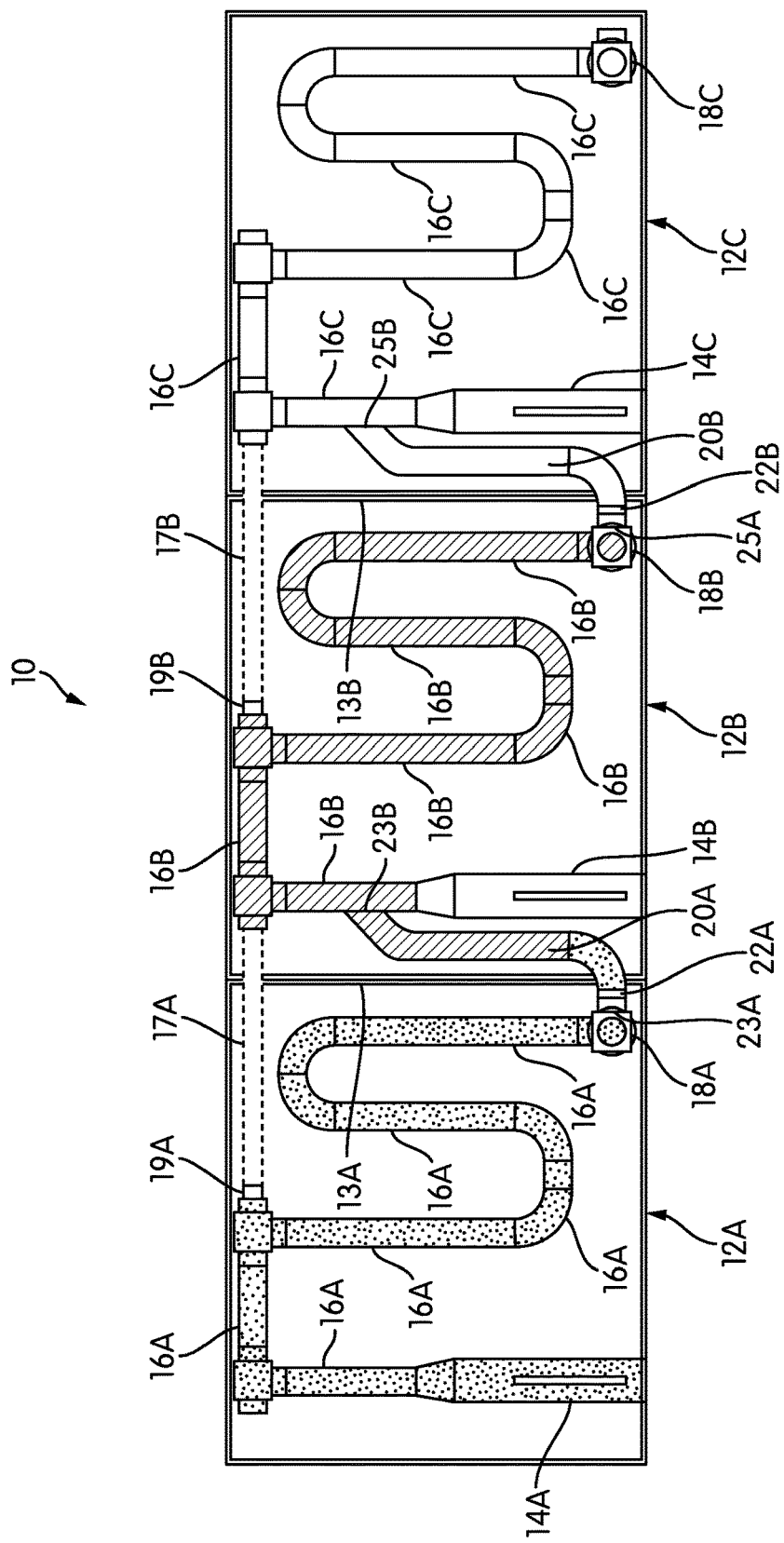

While the tobacco leaves from the first batch are still drying in the barn 12A, a second batch of tobacco leaves are disposed or hung inside the barn 12B (a second barn). Similarly to the barn 12A, the tobacco leaves can be, for example, hang on racks, clips or strings inside the barn 12B. After a certain time period T1 from the start of the heat source 14A (for example after air inside the barn 12A has reached a certain temperature or the tobacco leaves have lost a certain amount of moisture content) and the tobacco leaves from the second batch are hung inside the barn 12B, exhaust port 18A is closed and the gate, register or damper 22A is opened to allow the combustion gases from flue pipes 16A inside the barn 12A to transfer to flue pipes 16B inside the barn 12B, as illustrated in FIG. 1C. In an embodiment, the time period T1 is between 36 hours and 48 hours (about 2 days) from the start of heat source 14A. In an embodiment, the time period T1 may also be dependent on the tobacco reaping capability of the grower. For example, faster reaping and filling of the second barn 12B allows the damper 22A to be opened earlier than the 36 hours. In an embodiment, the barn 12A can be configured so that a certain amount of air will continue to be exhausted through exhaust port 18A to assist with the chimney-effect of removing moisture laden air from barn 12A. The heat from the transferred combustion gases is used to pre-heat or heat the air inside the barn 12B. The combustion gases transferred to the flue pipes 16B are exhaust through exhaust port 18B to outside atmosphere, as illustrated in FIG. 1C.

Figure 1D:
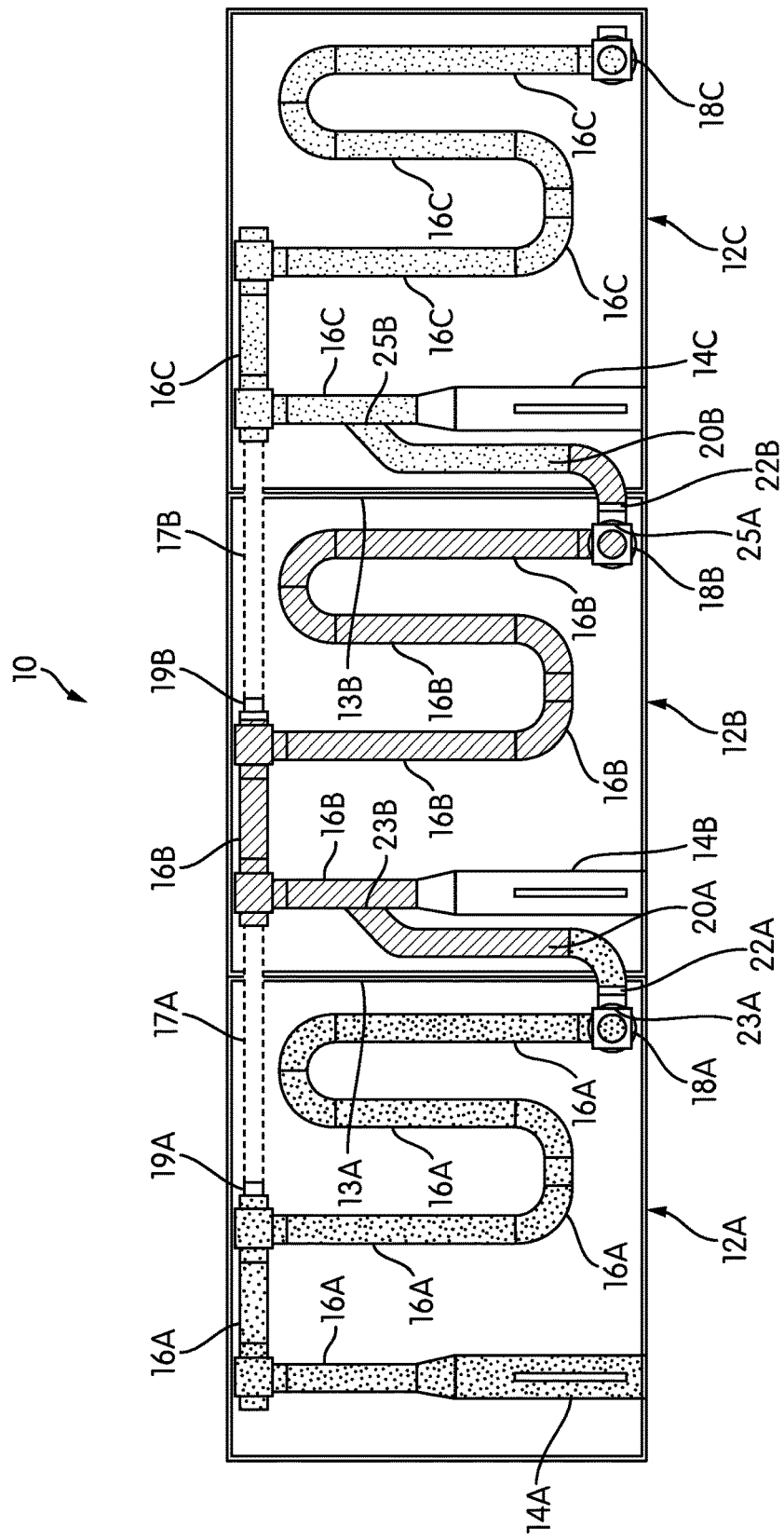

While the tobacco leaves from the second batch are still drying in the barn 12B, a third batch of tobacco leaves are disposed or hung inside the barn 12C (a third barn). After another time period T2 from the opening of the register or gate 22A (for example when the temperature inside the barn 12B has reached a certain level or when the moisture content of tobacco leaves has reached a certain level) and the tobacco leaves from the third batch are hung inside the barn 12C, the exhaust port 18B is closed and the register or damper 22B is opened to allow the combustion gases to pass into the flue pipes 16C inside the barn 12C, as illustrated in FIG. 1D. In an embodiment, the time period T2 is about 36 hours to 48 hours (about 2 days). The heat from the transferred combustion gases is used to pre-heat or heat the air inside the barn 12C. The combustion gases from flue pipes 16B inside barn 12B that transferred to flue pipes 16C inside barn 12C originate from the heat source 14A. As it can be appreciated, at this point in time, only heat source 14A is operating and combustion gases from heat source 14A are used to heat barn 12A, barn 12B and barn 12C, as illustrated in FIG. 1D. In an embodiment, the time period T2 may also be dependent on the tobacco reaping capability of the grower. For example, faster reaping and filling of the third barn 12C allows the damper 22B to be opened earlier than the 36 hours. The barn 12B can be configured so that a certain amount of air will continue to be exhausted through exhaust 18B to assist with the chimney-effect of removing moisture laden air from barn 12B.

Figure 1E:
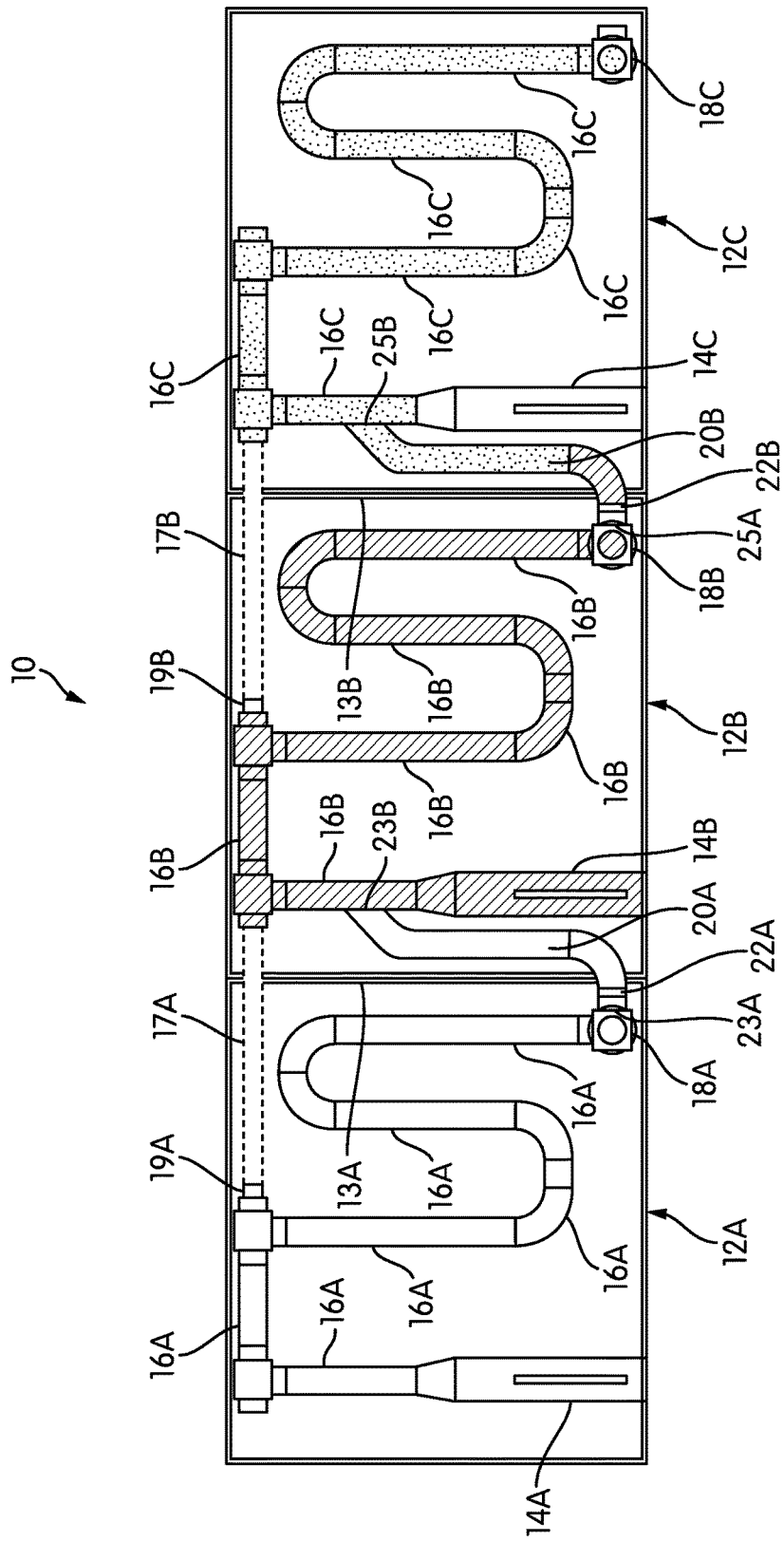

After a time period T3 from the opening of the register or damper 22B, the heat source 14B is started and the heat source 14A is stopped (when the tobacco in barn 12A has finished curing), as illustrated in FIG. 1E. In an embodiment, the time period T3 is between 36 hours and 48 hours (about 2 days). The heat generated by combustion gases from the heat source 14B continues to dry the second batch of leaves inside the barn 12B and dry the third batch of leaves in barn 12C, as illustrated in FIG. 1E. After circulating through flue pipes 16B inside barn 12B and the flue pipes 16C inside barn 12C, the combustion gases are allowed to exit through exhaust port 18C into the outside atmosphere, as illustrated in FIG. 1E. Therefore, the flue pipes 16B carrying the hot combustion gas generated by the combustion of the fuel in the heat source 14B is/are configured to heat the air inside the barn 12B to dry or cure the tobacco leaves housed inside the barn 12B.

Figure 1F:
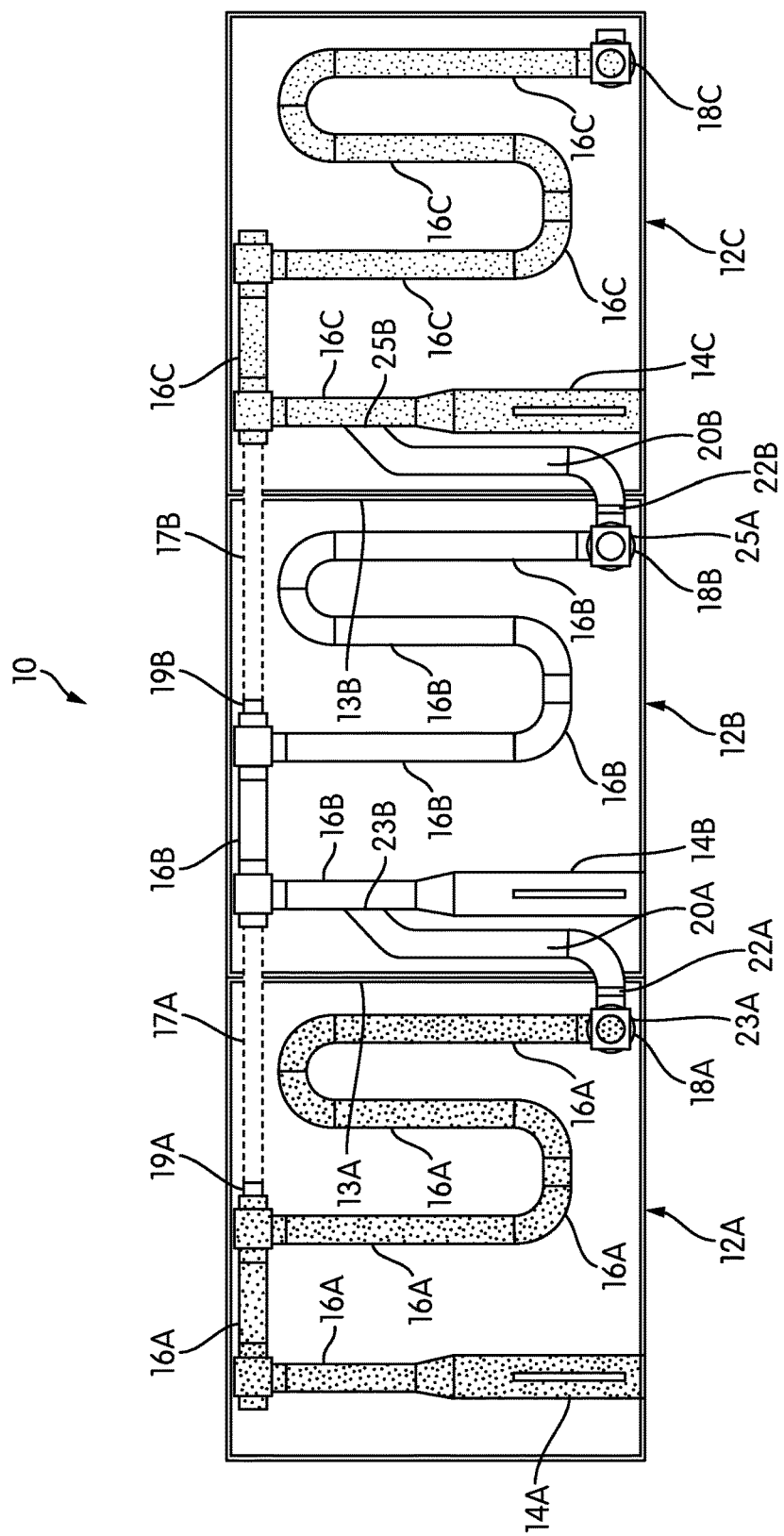

After a set time period T4 from the opening of the register or damper 22B, the heat source 14C is started and the heat source 14B is stopped (when the tobacco in barn 12B has finished curing), as illustrated in FIG. 1F. In an embodiment, the time period T4 is between about 48 hours and 54 hours (about 4 days). The heat generated by the combustion gases from the heat source 14C continues to dry the third batch of leaves inside the barn 12C. After circulating through flue pipes 16C inside barn 12C, the combustion gases are allowed to exit through exhaust port 18C to the outside atmosphere, as illustrated in FIG. 1F. Therefore, the flue pipes 16C carrying the hot combustion gases generated by the combustion of the fuel in the heat source 14C is/are configured to heat the air inside the barn 12C to dry or cure the tobacco leaves housed inside the barn 12C.

Therefore, as it can be appreciated, in an embodiment, heat generated by the heat source 14A is delivered to the barn 12A for approximately 6 days, delivered to the barn 12B for approximately 4 days, and delivered to the barn 12C for approximately 2 days. In addition, heat generated by the heat source 14B is delivered to barn 12B for approximately 2 days and delivered to barn 12C for approximately 2 days. The heat generated by the heat source 14C is delivered to barn 12C for approximately 2 days. Therefore, while the heat source 14A operates for a period of approximately 6 days, the heat source 14B and the heat source 14C both operate during a shorter period of time of only 2 days to all together dry or cure 3 batches of tobacco leaves. Table 1 summarizes the time of operation of each of the heat sources (HS) 14A. 14B and 14C in each barn 12A, 12B and 12C.

TABLE 1

|  | BARN (12A) | BARN (12B) | BARN (12C) |
|---|---|---|---|
| HS (14A) | 6 days | 4 days | 2 days |
| HS (14B) | 0 days | 2 days | 2 days |
| HS (14C) | 0 days | 0 days | 2 days |

Figure 1G:
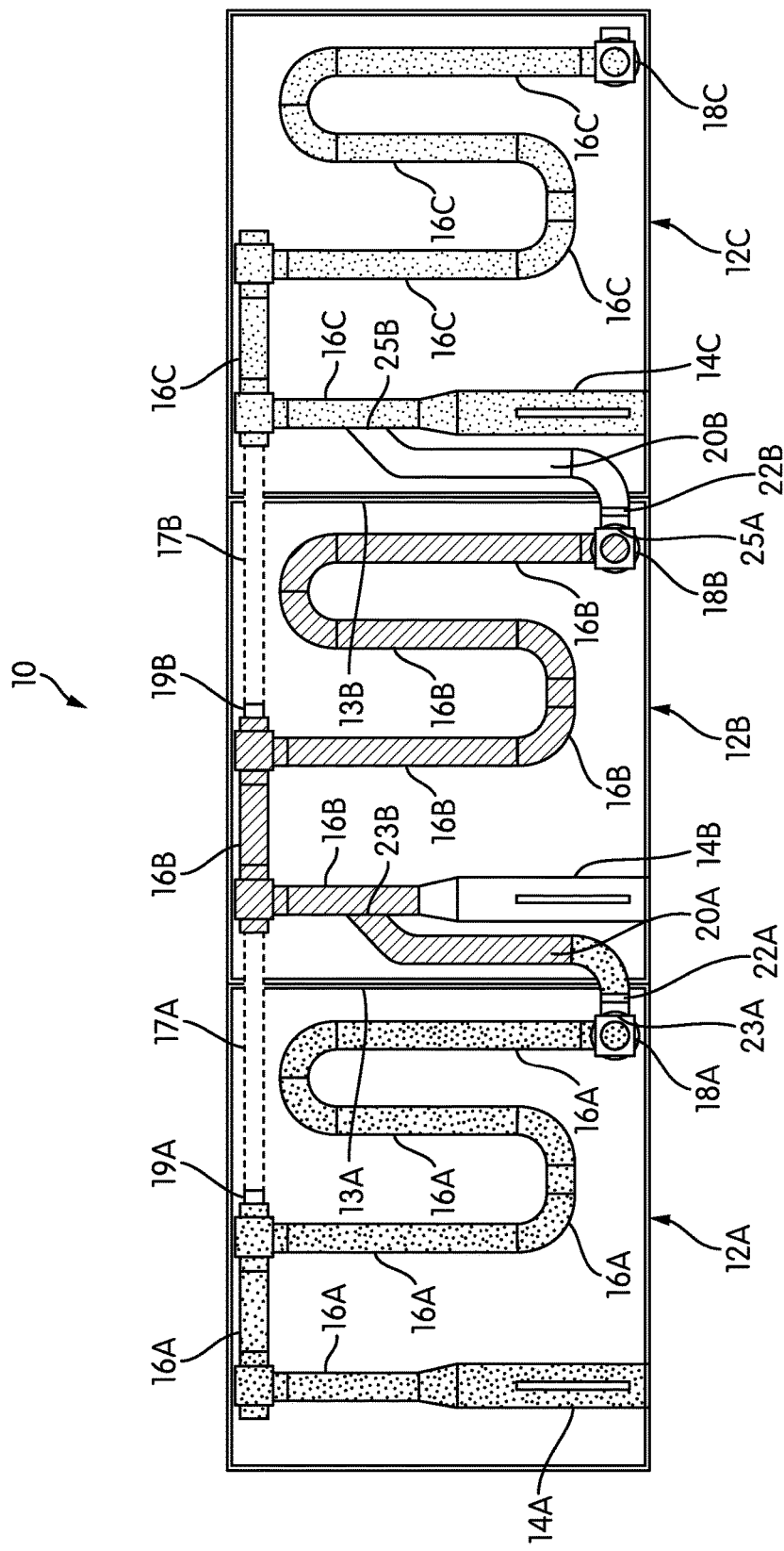

In an embodiment, the above process can be repeated in a second cycle to cure and dry another series of three batches of tobacco leaves. For example, while the third batch of tobacco leaves is dried or cured in the barn 12C using the heat source 14C, a fourth batch of tobacco leaves can be loaded into the first barn 12A and cured and dried using the heat source 14A in the first barn 12A while the combustion gases from the heat source 14A are exhausted through exhaust port 18A to outside atmosphere, as illustrated in FIG. 1F. While the third batch of tobacco leaves is in its final curing phase in the third barn 12C during a time period of approximately 2 days, the fourth batch of tobacco leaves in the first barn 12A is in its first drying or curing phase which also has a time period of approximately 2 days. During this time period of approximately 2 days, the second barn 12B is empty, as illustrated in FIG. 1F, and thus the second barn can be filled with a fifth batch of tobacco leaves. After filling the barn 12B with the fifth batch of tobacco leaves, the exhaust port 18A is closed and the register 22A is opened and the combustion gases from the heat source 14A are introduced into the flue pipes 16B inside the barn 12B so as to start drying or curing the fifth batch of tobacco leaves, as illustrated in FIG. 1G. The remaining procedures are similar to the procedures described above with respect to curing the first, second and third batches of tobacco leaves. As a result, the present described method of curing tobacco leaves can be applied continuously by using the first barn 12A, the second barn 12B and the third barn 12C in rotation. This allows improving the efficiency of the overall curing system.

Although the above process is described herein using an arrangement of 3 barns, this process can be applied using any number of barns, i.e., two or more barns. For example, it is also contemplated to use a four barn system with the transfer of combustion gases as described herein. In this case, for example, the combustion gases from the heat source 14C, heat source 14B or heat source 14A can be transferred to flue pipes within a forth barn (not shown).

In addition of being able to use the barns 12A, 12B and 12C in series or in rotation, the barns can also be used individually without using combustion gases from one heat source in one barn to another barn. Furthermore, bypass flue pipes 17A and 17B are also provided to allow, for example, bypassing the flue pipes 16A and/or 16B and thus not utilizing the barns 12A and/or 12B and employing the combustion gases from the heat source 14A located in barn 12A to dry or cure a batch of tobacco leaves deposited inside the barn 12B or the barn 12C. Another instance where the bypass pipes 17A and/or 17B may be utilized is when, for example, two heat sources may be used in tandem to dry a batch of tobacco leaves. In this situation for example, bypass pipe 17A can be used to transfer the combustion gases from the heat source 14A into the flue pipes 16B within the barn 12B (without passing through the flue pipes 16A inside the barn 12A) while at the same time the combustion gases from the heat source 14B are also used so as to dry a batch of tobacco leaves deposed in the barn 12B. In an embodiment, bypass pipes 17A and 17B can be used to increase temperatures in the adjacent barn if and when desired. By opening a damper 19A and bleeding hot combustion gas from the hot side of flue pipes 16A (for example, combustion gas temperature at the entry point of bypass pipe 17A can be approximately 90 degrees Celsius hotter than at point of connecting flue pipe 20A), the temperature in barn 12B can be increased to match drying/curing curve requirements. Similarly, by opening a damper 19B and bleeding hot combustion gas from the hot side of flue pipes 16B (for example, combustion gas temperature at the entry point of bypass pipe 17B can be approximately 90 degrees Celsius hotter than at point of connecting flue pipe 20B), the temperature in barn 12C can be increased to match drying/curing curve requirements. The dampers 19A, 19B can be adjusted between 0% to 100% open depending on temperature requirements in the neighboring barn (respectively, barn 12B and barn 12C).

Figure 2:
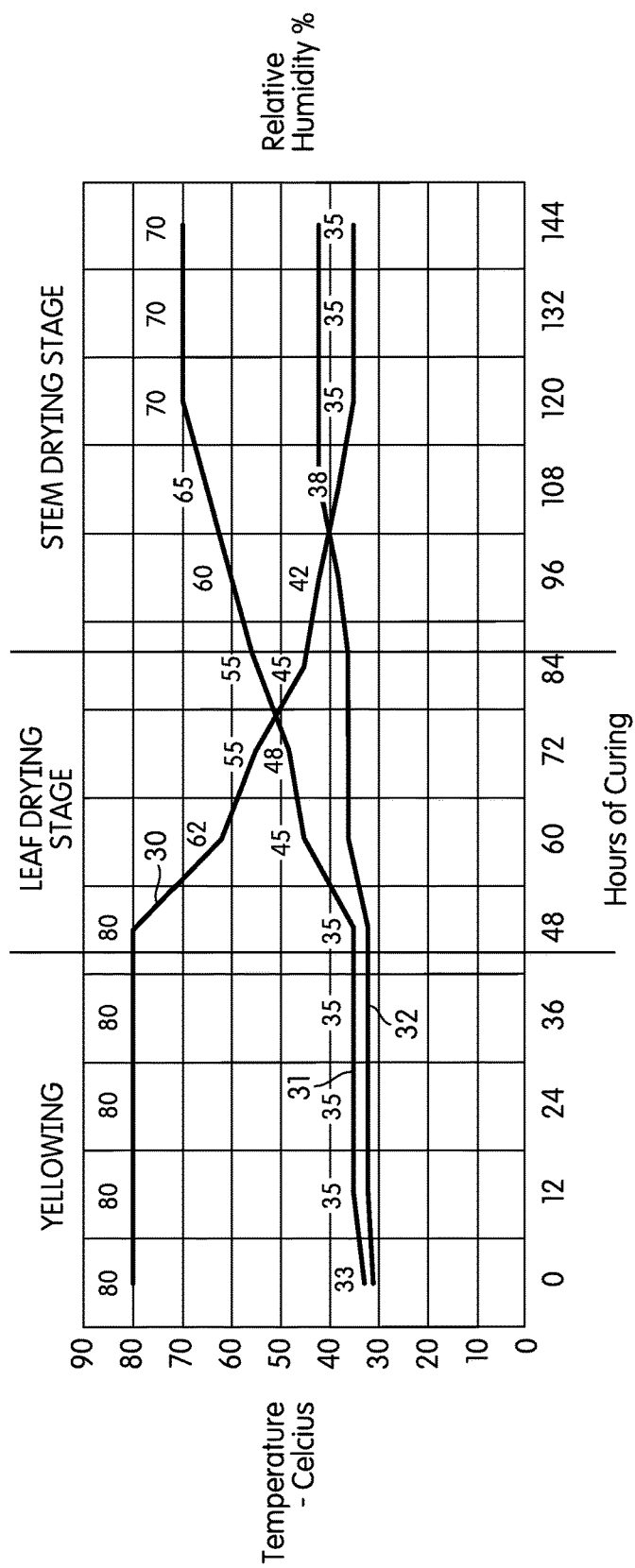
FIG. 2 is a diagram depicting a flue cured Virginia tobacco drying and curing cycle showing variation of temperature and relative humidity within a curing chamber as a function of curing or drying time, according to an embodiment of the present disclosure.

FIG. 2 is a plot of change in temperature and relative humidity across the curing or drying time, according to an embodiment of the present disclosure. Curve 30 shows the variation of relative humidity as a function of curing time. Curve 31 shows the variation of temperature of a dry bulb as a function of drying or curing time. Curve 32 shows the variation of temperature of a humid or wet bulb as a function of drying or curing time. The curing or drying of the tobacco leaves can be divided into three stages:

A yellowing stage wherein the tobacco leaves chlorophyll breaks down, starch is converted to sugars, leaves wilt, and the curing environment has a relative humidity of approximately 80% or greater. The yellowing stage has an approximate time period between 36 hours to 48 hours.

A leaf drying stage wherein the relative humidity decreases from approximately 80% to approximately 45%. At this stage of curing, the water removal rate is maximized and the leaf color is fixed or set. The leaves' cells die at approximately 45 deg. C. and most biological processes cease by the end of the leaf drying stage. The leaf drying stage has a time period of approximately 36 hours to 48 hours.

A stem drying stage wherein the relative humidity decreases from approximately 45% to approximately 35% or less. The tobacco leaves' lamina and stem or mid-rib moisture content is dried to less than 18%. The stem drying stage has a time period of approximately 60 hours.

During the yellowing stage, the temperature of dry bulb and humid or wet bulb remain at about 35 deg. C. with variation of approximately 2-3 deg. C. lower reading on the humid or wet bulb. During the leaf drying stage the temperature of the dry bulb increase from about 35 deg. C to about 55 deg. C and the temperature of the humid or wet bulb increase slightly from about 35 deg. C to about 40 deg. C. During the stem drying stage, the temperature of the dry bulb increase from about 55 deg. C to about 70 deg. C and the temperature of the humid or wet bulb increase slightly from about 40 deg. C to about 43 deg. C. The drying or curing time of tobacco bulb is approximately 144 hours (6 days).

Figure 3:
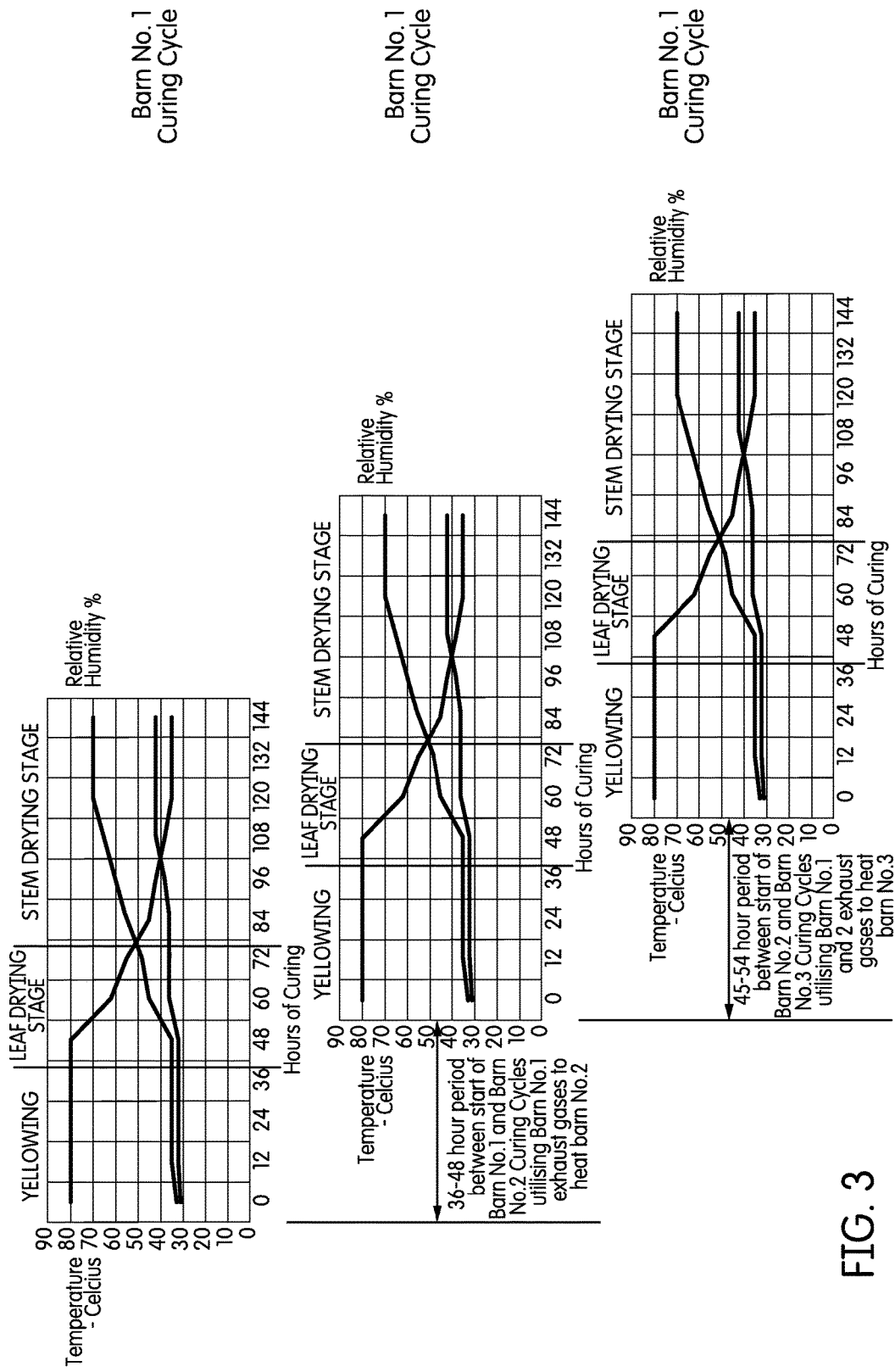
FIG. 3 is a diagram depicting a tobacco drying or curing cycle employing three barns, according to an embodiment of the present disclosure.

FIG. 3 is a diagram depicting a drying or curing cycle employing the three barns 12A, 12B and 12C, according to an embodiment of the present disclosure. As shown in FIG. 3, the second barn 12B is used 36 hours to 48 hours (about 2 days) from the start of the first barn 12A to cure the second batch of tobacco leaves by initially using the combustion gases from the heat source 14A located in the first barn 12A by opening the register or damper 22A and then following by a full cure using the heat source 14B located in the second barn 12B. As shown in FIG. 3, heating the second barn 12B is started after the temperature of the first batch of tobacco leaves reach the end of the yellowing stage. The third barn 12C is used 24 hours to 36 hours (about 2 days) from the start of the second barn 12B (i.e., 4 days from the opening of the register or damper 22A) to cure the third batch of tobacco leaves initially by using the combustion gases from the first heat source 14A, then by using the combustion gases from the second heat source 14B and finally to a final cure by using the third heat source 14C located in the third barn 12C. As shown in FIG. 3, heating the third barn 12C is started after the temperature of the second batch of tobacco leaves has also reached the end of the yellowing stage. In an embodiment, the start of barn 12C is also dependent on the tobacco reaping capability of the grower. As soon as barn 12C has been filled with tobacco, damper 22B can be opened to allow the combustion gases in the flue pipes 16B to flow into the connecting flue pipe 20B.

Figure 4:
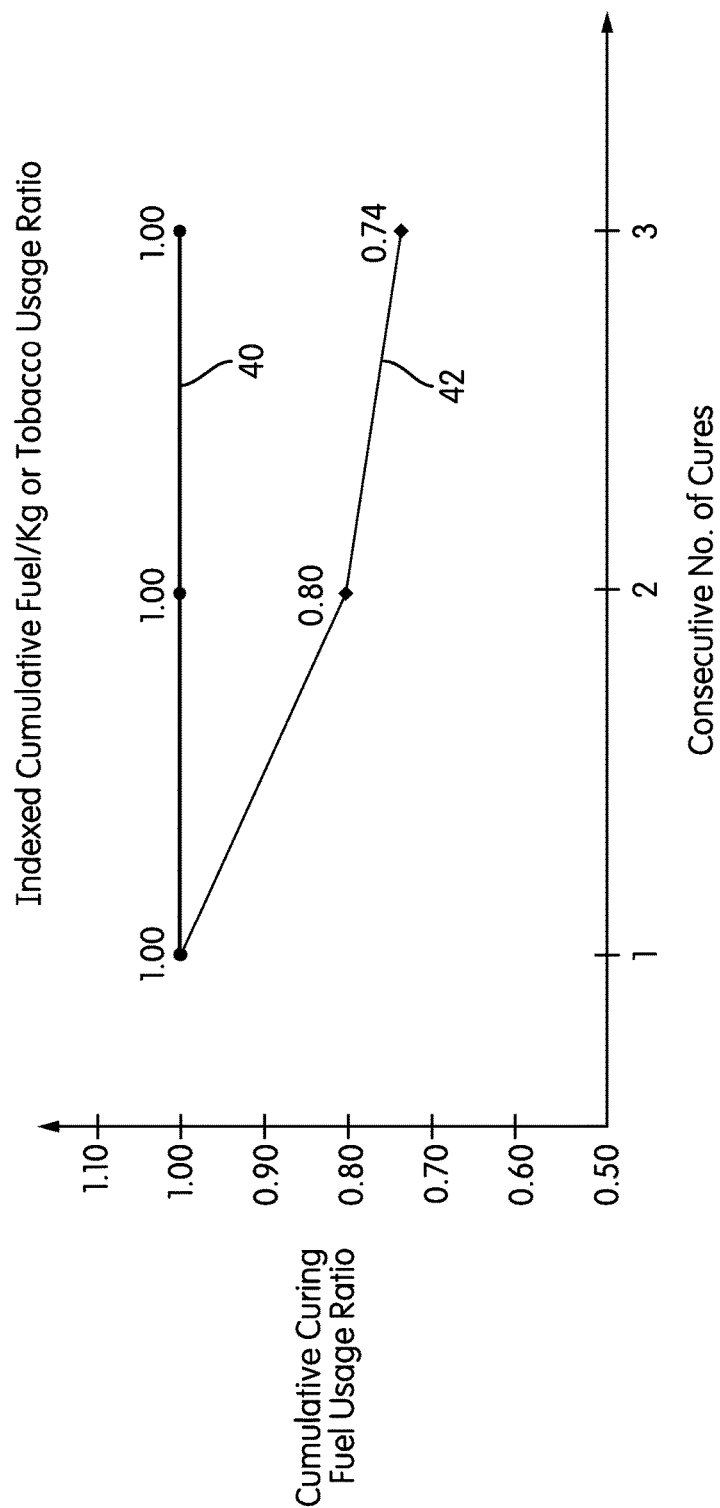
FIG. 4 is a plot of the ratio of cumulative curing fuel usage to tobacco mass as a function of the number of cures, according to an embodiment of the present disclosure.

FIG. 4 is a plot of the ratio of cumulative curing fuel usage to tobacco mass as a function of the number of cures, according to an embodiment of the present disclosure. Curve 40 represents the variation of the ratio of fuel usage to the mass of tobacco leaves as a function of the number of consecutive number of cures in a conventional system without recycling the combustion gases from one barn to another barn. In this case, as expected, the ratio is equal to one as each barn uses fuel independently from the next barn. Curve 42 represents the variation of the ratio of fuel usage to the mass of tobacco leaves as a function of the number of consecutive number of cures in a system according to an embodiment of the present disclosure in which combustion gases from one barn are used in a neighboring barn, as described in the above paragraphs. In this case, the ratio decreases from 1 to approximately 0.74. As shown by the curve 41, in the first cure, the ratio is equal to one. Therefore, in the first barn 12A, the full amount of fuel is used by the heat source 14A to cure the full batch of tobacco leaves deposited in the first barn 12A. However, in the second cure of the second batch deposited in the second barn 12B, the ratio decreases to 0.8 due to the utilization of the combustion gases from the first heat source 14A located in the first barn 12A to cure second batch of leaves in the second barn 12B. In other words, the full utilization of the heat source 14B in the second barn is reduced by 20% by using the combustion gases from the first heat source 14A. This allows saving energy of burning less fuel to cure the second batch of tobacco leaves. The ratio is further reduced to 0.74 when curing the third batch of tobacco leaves due to the utilization of the combustion gases from the first heat source 14A located in the first barn 12A and the combustion gases from the second heat source 14B located in the second barn to cure third batch of tobacco leaves. In other words, the full utilization of the heat source 14C in the third barn is reduced by approximately 26% by using the combustion gases from the first heat source 14A and the second heat source 14B. As a result, the curing efficiency can be improved by using less fuel to achieve the same curing of tobacco leaves.

TABLE 2

| Barn No. | Green Leaves Weight (Kg) | Dry Leaves Weight (Kg) | Dry Yield (%) | Tobacco Cure Duration (Days) | LPG Gas Usage Per Cure (Kg) | Ratio of LPG/Tobacco per Cure |
| --- | --- | --- | --- | --- | --- | --- |
| 1 | 1507 | 282 | 18.71% | 6 | 287 | 1.02 |
| 2 | 1560 | 302 | 19.36% | 5 | 282 | 0.93 |
| 3 | 1460 | 263 | 18.01% | 6 | 270 | 1.03 |

Table 2 summarizes results of drying or curing tobacco leaves using individual independent barns. These results are obtained without using recirculating combustion gases from one heat source located in one barn into a second adjacent barn. As shown in Table 2, the ratio of fuel weight to the weight of dry tobacco leaves is approximately 1 independent of the barn used to dry the tobacco leaves.

Table 3 summarizes results of drying or curing tobacco leaves using individual independent barns and using barns wherein combustion gases from one barn are using in the next barn in accordance with the process described above. As shown in Table 3, the ratio of fuel weight to the weight of dry tobacco leaves is approximately 1 when independent barns are used in isolation. However, the ratio of fuel weight to the weight of dry tobacco leaves decreases from 1.02 to 0.58 and 0.67 when using the recycling of combustion gases from the first barn 12A to the second barn 12B and third barn 12C, respectively, as described in the above paragraphs. When taking into account the overall cumulative usage of LPG in successive heat sources in successive barns, the ratio of LPG usage to dry tobacco leaves weight, the ratio varies decreases from 1.02 to 0.79 and 0.75 when taking into account the yield from the second barn 12B and third barn 12C, respectively. As it can be appreciated the above results are obtained for a certain variety of tobacco, and another variety of tobacco may lead to slightly different results. However, regardless of tobacco variety or type, the ratio of fuel usage can be decreased while achieving the desired curing and thus the overall curing efficiency can be enhanced.

TABLE 3

| Barn No. | Green Leaves Weight (Kg) | Dry Leaves Weight (Kg) | Dry Yield (%) | Tobacco Cure Duration (Days) | LPG Gas Usage Per Cure (Kg) | Ratio of LPG/Tobacco per Cure | Ratio of LPG/Tobacco per Cure Cumulative | LPG Gas Usage per Cure (Kg) (with Recycling Exhaust) | Ratio of LPG/Tobacco per Cure (with Recycling Exhaust) | Ratio of LPG/Tobacco per Cure (with Recycling Exhaust) Cumulative |
|---|---|---|---|---|---|---|---|---|---|---|
| 1 | 1507 | 282 | 18.71% | 6 | 287 | 1.02 | 1.02 | 287 | 1.02 | 1.02 |
| 2 | 1560 | 302 | 19.36% | 5 | 282 | 0.93 | 0.97 | 175 | 0.58 | 0.79 |
| 3 | 1460 | 263 | 18.01% | 6 | 270 | 1.03 | 0.99 | 175 | 0.67 | 0.75 |

Figure 5A:
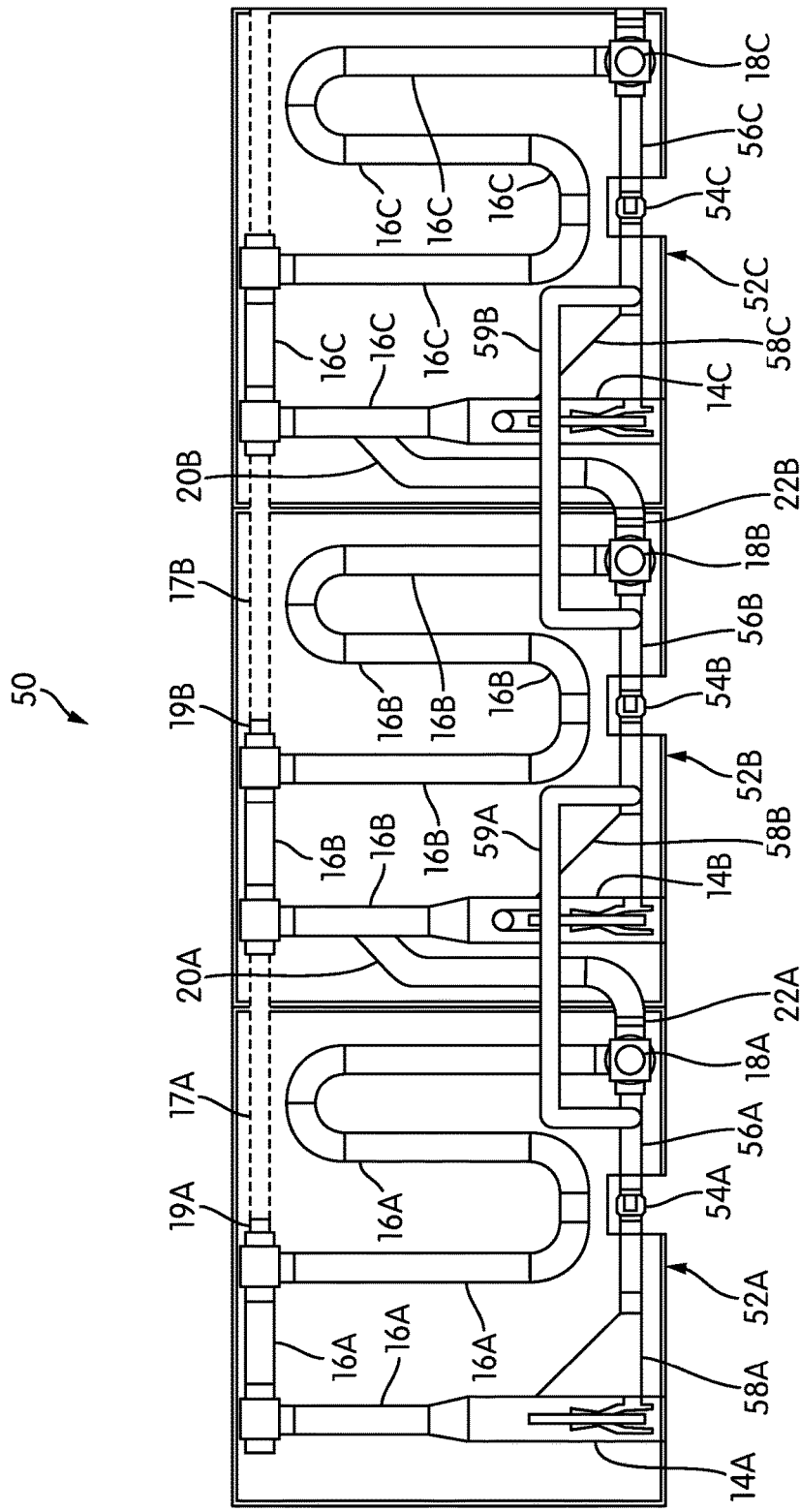
FIGS. 5A-5G are plan views of a system for drying or curing tobacco leaves, according to another embodiment of the present disclosure.

FIGS. 5A-5G are a plan views of a system for drying or curing tobacco leaves, according to another embodiment of the present disclosure. For example, in an embodiment as illustrated in FIG. 5A, the system for drying or curing tobacco leaves 50 includes a plurality of chambers, housings or barns 52A, 52B and 52C configured for housing or receiving tobacco leaves (not shown). For example, similar to the barns 12A, 12B and 12C, tobacco leaves can be hung on racks or the like that are provided inside the barns 52A, 52B, 52C, as is conventionally known. In FIGS. 5A-5G same reference numerals are used for similar components described above with respect to the system 10 comprising the barns 12A, 12B and 12C for curing tobacco leaves. Therefore, the description of the system with respect to these components will not be repeated in the following paragraphs.

However, in addition to the components described above with respect to the system 10, barns 52A, 52B and 52C of system 50 may be provided with a fan at location 54A, location 54B or location 54C. In an embodiment, a same fan can be used in each barn 52A, 52B, 52C, at respective locations 54A, 54B, 54C. In which case, for example, the same fan can be moved from location 54A to the location 54B or moved to location 54C. For example, when the fan is moved from its current location 54A, a piece of pipe or duct work can be used to complete the gap left by the removed fan at the location 54A. In an embodiment, for example, the fan at location 54A is connected to exhaust port 18A via flue pipe 56A and is connected to heat source 14A via return flue pipe 58A. The fan at location 54A is configured to return at least a portion of the combustion gases to the heat source 14A so as to increase the amount of flow of combustion gases that recirculate through the flue pipes 16A, as illustrated in FIG. 5B.

Similarly, when the same fan is moved to location 54B, the fan at location 54B is connected to exhaust port 18B via flue pipe 56B and is connected to heat source 14B via return flue pipe 58B. A bypass flue pipe 59A connects the return flue pipe 58B to the flue pipe 56A. The bypass flue pipe 59A allows to bypass the heat source 14B when desired to transfer the combustion gases drawn by the fan back to the heat source 14A, as illustrated in FIG. 5C, as will be described further in detail in the following paragraphs.

Similarly, when the fan is provided at location 54C, the fan is connected to exhaust port 18C via flue pipe 56C and is connected to heat source 14C via return flue pipe 58C. A bypass flue pipe 59B connects the return flue pipe 58C to the flue pipe 56B. The bypass flue pipe 59B allows to bypass the heat source 14C when desired to transfer the combustion gases drawn by the fan back to the heat source 14A or 14B, as will be described further in detail in the following paragraphs.

Figure 5B:
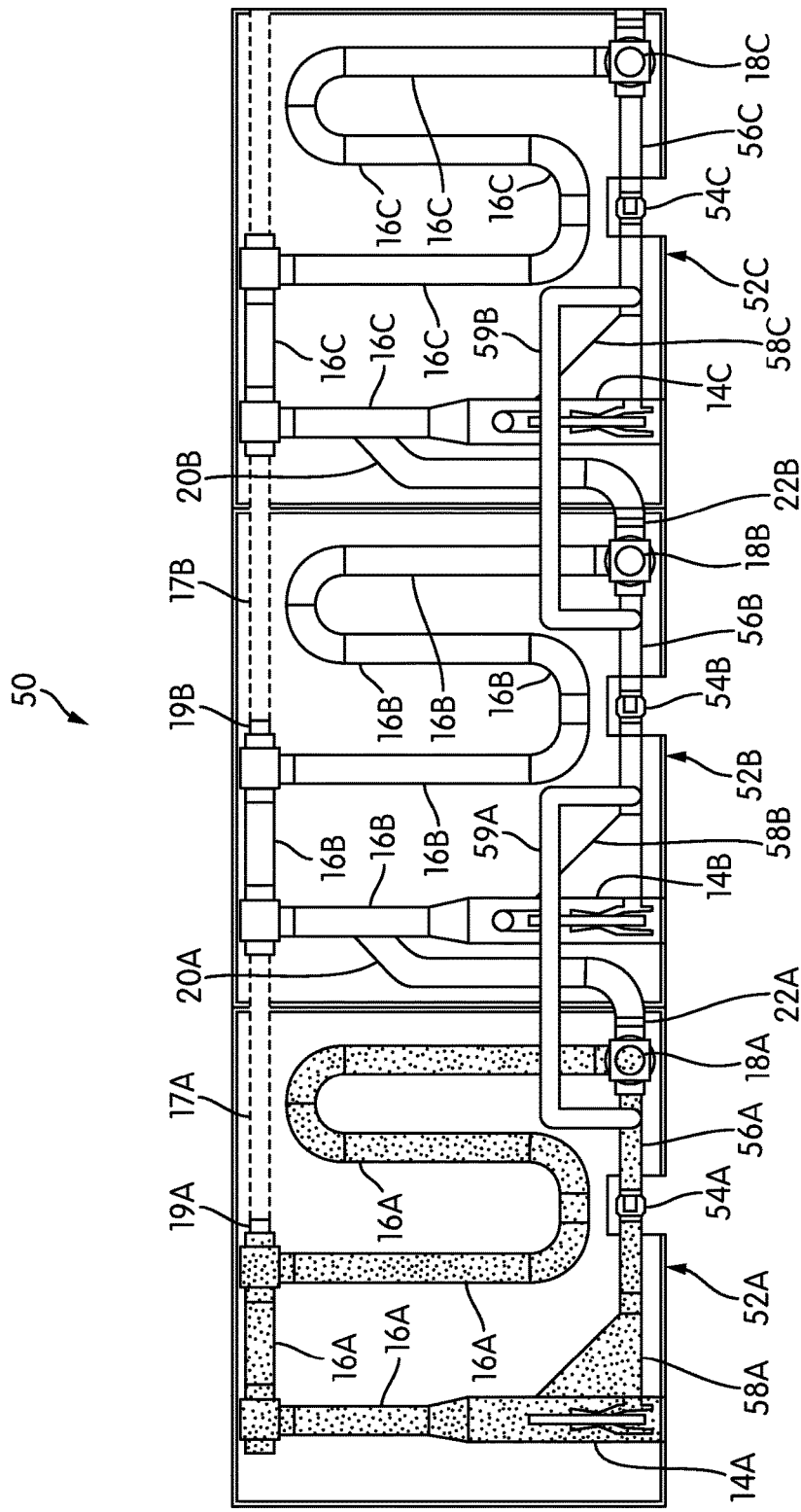
Figure 5C:
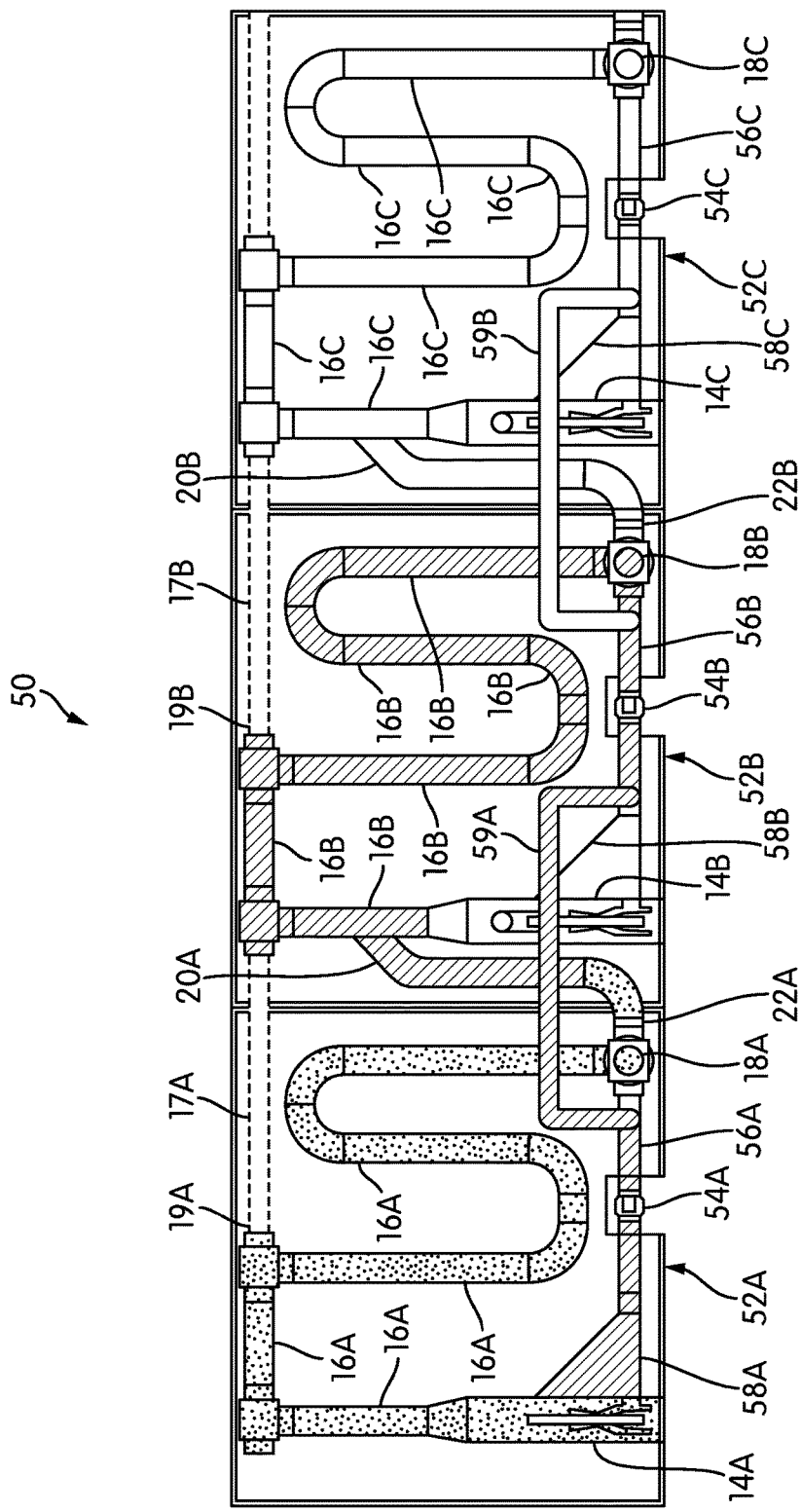
Figure 5D:
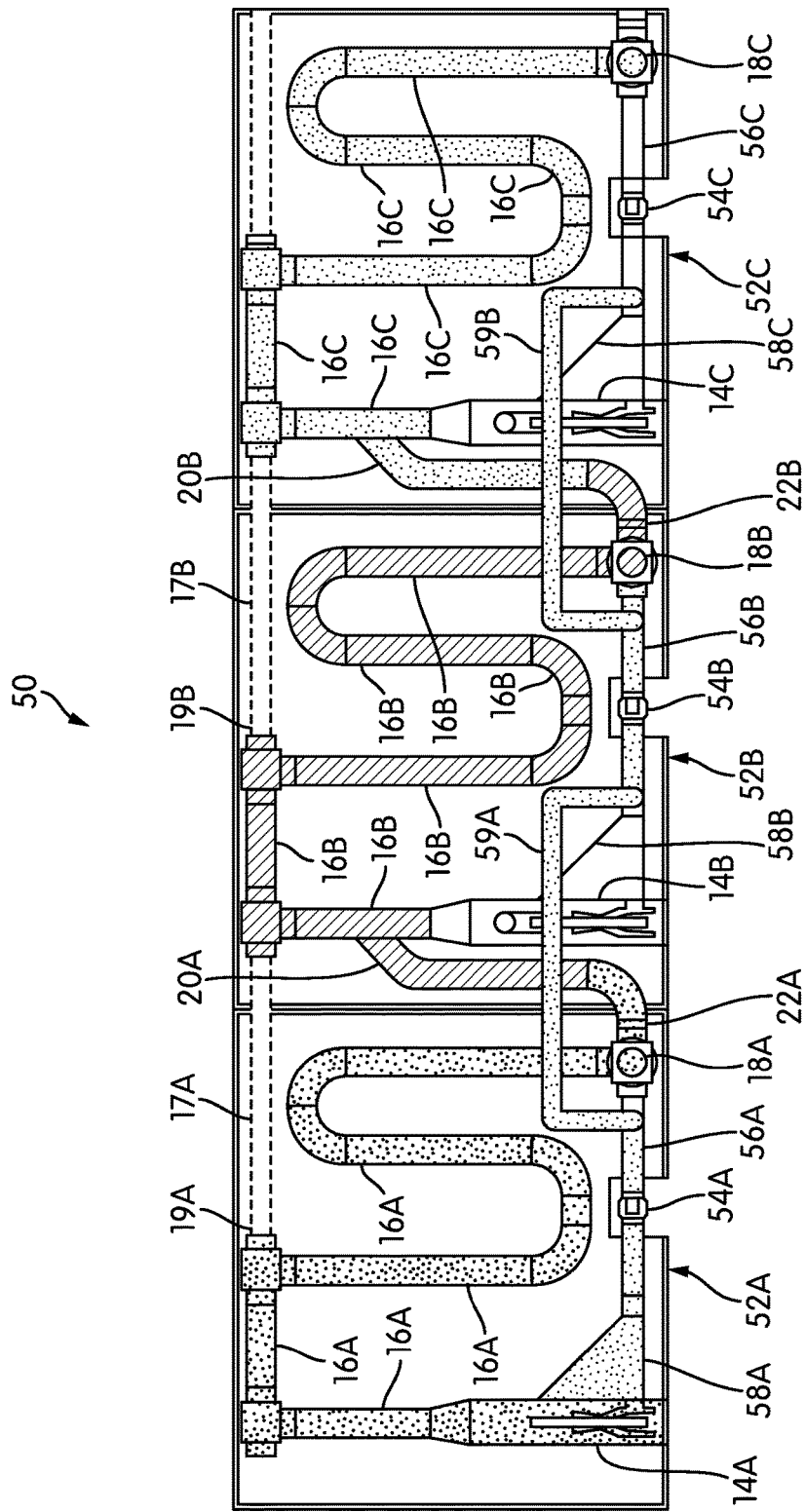

In an embodiment, while register 22A is closed the fan at location 54A recirculates hot combustion gases within barn 52A only, as shown in FIG. 5B. When register 22A is opened then the fan at location 54A recirculates hot gases through duct (flue pipes) 56B, 58B, 59A, 56A and 58A back to heat source 14A, as shown in FIG. 5C. When register 22A and 22B are both open, then the fan at location 54A recirculates hot gases through duct (flue pipes) 56C, 58C, 59B, 56B, 58B, 59A, 56A and 58A back to heat source 14A, as shown in FIG. 5D.

Figure 5E:
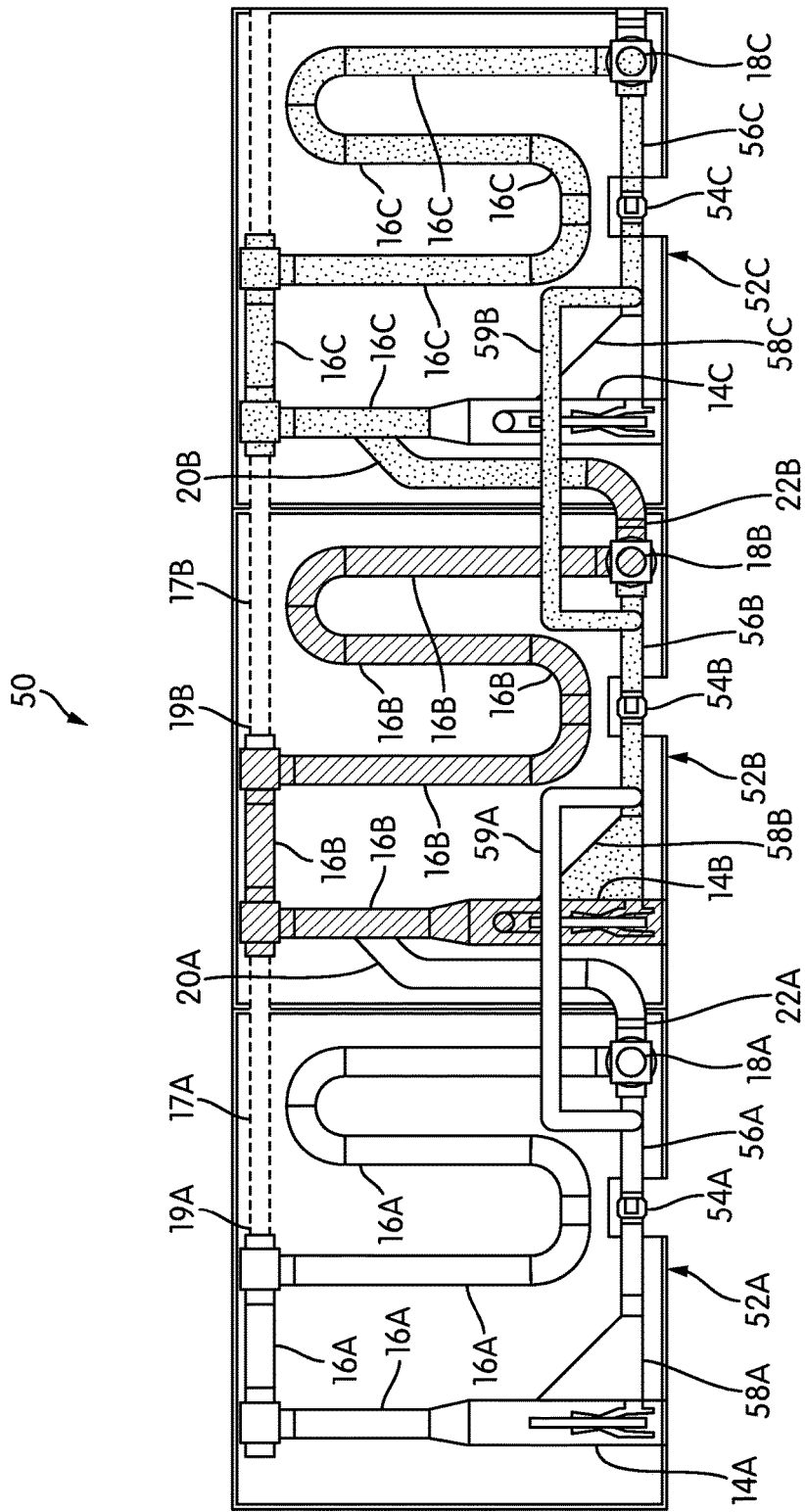

When barn 52A has finished its curing cycle and heat source 14B is switched on, the fan unit is then positioned at position 54B. While register 22B is closed fan recirculates hot gas within barn 52B only, as shown in FIG. 5E. When register 22B is opened then fan recirculates hot gases through duct 56C, 59B and 56B back to heat source 14B, as shown in FIG. 5E. When barn 52B has finished its curing cycle and heat source 14C is switched on, the fan unit is moved and positioned at position 54A again. The Fan recirculates hot gases through duct 56C, 58C, 59B, 56B, 58B, 59A, 56A and 58A back to heat source 14A and through flue pipes 16A with register 22A open and 18A closed.

In an embodiment, the fan positioned at location 54A, location 54B or location 54C can be energized using electrical energy if available. The electrical energy can be supplied through the electrical grid or supplied by converting solar energy using solar panels and/or electrical batteries, or using an electric generator that employs LPG, gasoline or other form of fuel. The fans can be used regardless of the type of fuel used in the heat sources 14A, 14B and 14C be it wood, coal, or LPG, etc.

In the following paragraphs a process of curing tobacco leaves is described using the above system that employs a recirculating fan. As it can be appreciated, initially, the barn 52A is filled with a first batch of tobacco leaves, before starting the heat source 14A, as illustrated in FIG. 5A. For example, the tobacco leaves can be hung on racks, or placed on shelves or the like inside the barn 52A. The heat source 14A (e.g., a furnace using wood, coal or gas as fuel) is then started, as illustrated in FIG. 5B. Heat generated by the hot combustion gases generated by the combustion of the fuel in the heat source 14A flows through the flue pipes 16A and is used to heat the air inside the barn 52A to dry the first batch of tobacco leaves hung inside the barn 52A, as illustrated in FIG. 5B. Heat generated by the hot combustion gas from the heat source 14A heats the walls of the flue pipes 16A. The heat from the walls of the flue pipes 16A is transmitted by conduction to the air surrounding the flue pipes 16A. The hot air then propagates through convection to contact the tobacco leaves to dry the tobacco leaves (i.e., gradually remove the moisture within the tobacco leaves). After circulating through the flue pipes 16A inside the barn 52A, instead of exiting through the exhaust port 18A into the outside atmosphere, at least a portion of the combustion gases are recycled using the fan positioned at 54A and the combustion gases are sent back towards the heat source 12A, as illustrated in FIG. 5B.

While the tobacco leaves from the first batch are still drying in the barn 52A, a second batch of tobacco leaves are disposed or hung inside the barn 52B. Similarly to the barn 52A, the tobacco leaves can be, for example, hang on racks inside the barn 52B. After a certain time period T1 from the start of the heat source 14A (for example after air inside the barn 12A has reached a certain temperature or the tobacco leaves have lost a certain amount of moisture content) and the tobacco leaves from the second batch are hung inside the barn 52B, the gate, register or damper 22A is opened to allow the combustion gases from flue pipes 16A inside the barn 52A to transfer to flue pipes 16B inside the barn 52B, as illustrated in FIG. 5C. In an embodiment, the time period T1 is between 36 hours and 48 hours (about 2 days) from the start of heat source 14A. The heat from the transferred combustion gases is used to pre-heat the air inside the barn 52B. Instead of evacuating the combustion gases to atmosphere through exhaust port 18B, a portion of the combustion gases transferred to the flue pipes 16B are recycled and are sent back towards the heat source 14A using the fan located at location 54A via flue pipe 56B, flue pipe 58B, the bypass flue pipe 59A, flue pipe 56A, and flue pipe 58A, as illustrated in FIG. 5C.

While the tobacco leaves from the second batch are still drying in the barn 52B, a third batch of tobacco leaves are disposed or hung inside the barn 52C. After another set time period T2 from the opening of the register or gate 22A (for example when the temperature inside the barn 12B has reached a certain level or when the moisture content of tobacco leaves has reached a certain level) and the tobacco leaves from the third batch are hung inside the barn 12C, the register or damper 22B is opened to allow the combustion gases to pass into the flue pipes 16C inside the barn 12C, as illustrated in FIG. 5D. In an embodiment, the time period T2 is about 36 hours to 48 hours (about 2 days). The heat from the transferred combustion gases is used to pre-heat the air inside the barn 52C. The combustion gases from flue pipes 16B inside barn 12B that transferred to flue pipes 16C inside barn 52C originate from the heat source 14A. As it can be appreciated, at this point in time, only heat source 14A is operating and combustion gases from heat source 14A are used to heat barn 52A, barn 52B and barn 52C, as illustrated in FIG. 5D. Instead of evacuating the combustion gases to atmosphere through exhaust port 18C, the combustion gases transferred to the flue pipes 16C are recycled and are sent back towards the heat source 14A using the fan located at location 54A via, flue pipes 56C, 58C, the bypass flue pipe 59B, flue pipe 56B, flue pipe 58B, bypass flue pipe 59A, flue pipe 56A, and flue pipe 58A, as illustrated in FIG. 5D.

After a set time period T3 from the opening of the register or damper 22B, the heat source 14B is started and the heat source 14A is stopped (when tobacco has finished curing in barn 12A), as illustrated in FIG. 5E. In an embodiment, the time period T3 is between 36 hours and 48 hours (about 2 days). The heat generated by combustion gases from the heat source 14B continues to dry the second batch of leaves inside the barn 52B and dry the third batch of leaves in barn 52C, as illustrated in FIG. 5E. The fan is moved to location 54B. After circulating through flue pipes 16B inside barn 52B and the flue pipes 16C inside barn 52C, the combustion gases are recycled and sent back towards the heat source 14B using the fan at location 54B via flue pipe 56C, flue pipe 58C, the bypass flue pipe 59B, flue pipe 56B, and flue pipe 58B as illustrated in FIG. 5E.

Figure 5F:
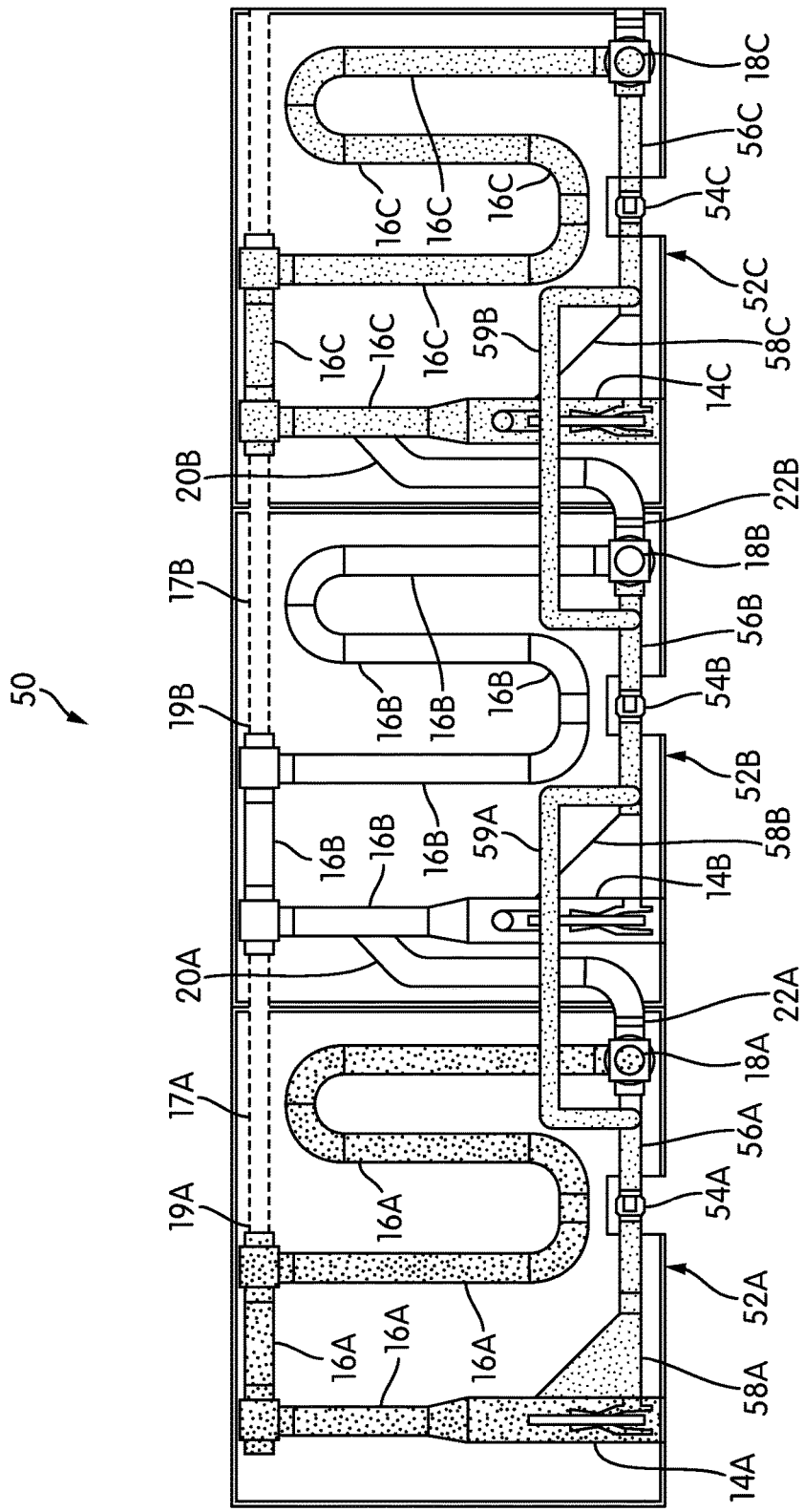

After a set time period T4 from the opening of the register or damper 22B, the heat source 14C is started and the heat source 14B is stopped, as illustrated in FIG. 5F. In an embodiment, the time period T4 is between about 48 hours and 54 hours (about 4 days). The heat generated by combustion gases from the heat source 14C continues to further dry the third batch of leaves inside the barn 52C. The fan can be moved to the location 54C and the combustion gases can be recirculated using the fan at location 54C. The fan at location 54C pushes the combustion gases back towards the heat source 14B or towards the heat source 14A to heat the barns 52B or 52A, respectively.

Figure 5G:
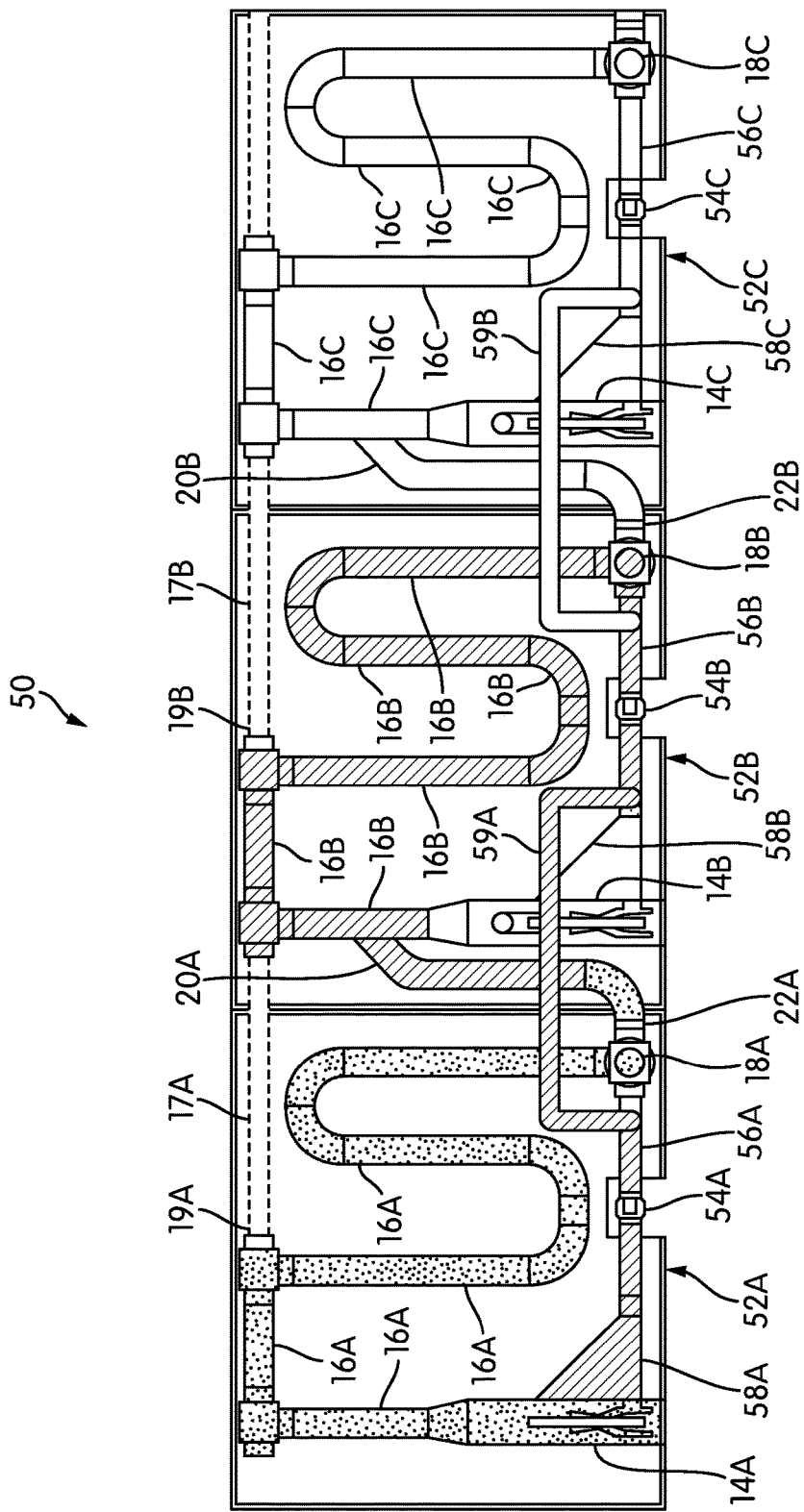

In an embodiment, the above process can be repeated in a second cycle to dry another series of three batches of tobacco leaves. For example, while the third batch of tobacco leaves is dried or cured in the barn 52C using the heat source 14C, a fourth batch of tobacco leaves can be loaded into the first barn 52A and dried using the heat source 14A in the first barn 52A while the combustion gases from the heat source 14A are recycled and sent back towards the heat source 14A using the fan that is moved back to location 54A, as illustrated in FIG. 5F. As it can be appreciated, for example, the heat generated by combustion gases from the heat source 14C can be used to heat barn 52A for approximately the first two days of the curing cycle and when barn 52C has finished its cure, the heat source 14A can be started. While the third batch of tobacco leaves is in its final curing phase in the third barn 12C which has a time period of approximately 2 days, the fourth batch of tobacco leaves in the first barn 52A is in its first drying or curing phase which also has a time period of approximately 2 days. During this time period of approximately 2 days, the second barn 12B is empty and thus the second barn can be filled with a fifth batch of tobacco leaves, as illustrated in FIG. 5F. After filling the barn 52B with the fifth batch of tobacco leaves, the register 22A is opened and the combustion gases from the heat source 14A are introduced into the flue pipes 16B inside the barn 12B so as to start drying or curing the fifth batch of tobacco leaves, as illustrated in FIG. 5G. The combustion gases in fuel pipe 16B are recycled and send back toward heat source 14A using the fan at location 54A, as shown in FIG. 5G. The remaining procedures are similar to the procedures described above with respect to curing the first, second and third batches of tobacco leaves. As a result, the present described method of curing tobacco leaves can be applied continuously by using the first barn 52A, the second barn 52B and the third barn 52C in rotation. In addition, by using the fans at successive locations 54A, 54B and 54C along with the bypass flue pipes 59A, and 59B, the curing efficiency is further enhanced as the combustion gases are recycled for use for curing the tobacco leaves. However, the use of the fan at the various locations 54A, 54B and 54C requires the use of an additional source of energy such as electrical power delivered by the electrical grid, using solar energy or batteries or using an electric generator that employs LPG, gasoline or other form of fuel. As it must be appreciated, the heat sources 14A, 14B and 14C can be provided with or without a Venturi system in the case of using LPG or other suitable fuel. The system of recycling of combustion gases using the fan at location 54A, 54B or 54C is applicable for any type of heat source using any type of fuel. In an embodiment, the estimated fuel usage decreases from about 1 to about 0.6 over 18 consecutive cures in an average tobacco curing season.

Table 4 summarizes comparative results between drying or curing tobacco leaves using individual independent barns and using barns wherein combustion gases from one barn are used in the next barn in accordance with the process described above. The present results are obtained using a heat source provided or fitted with a Venturi system with LPG as the fuel system. As shown in Table 4, the cumulative ratio of fuel weight to the weight of dry tobacco leaves is approximately 0.88, 0.84 and 0.85, for the barns 14A, 14B and 14C when used independently from each other. The cumulative ratio of fuel weight to the weight of dry tobacco leaves decreases from 0.88 to 0.70 and then to 0.67 when using the recycling of combustion gases from the first barn 12A to the second barn 12B and third barn 12C, respectively, as described in the above paragraphs.

the first barn 12A and the combustion gases from the second heat source 14B located in the second barn to cure third batch of tobacco leaves. In other words, the full utilization of the heat source 14C in the third barn is reduced by approximately 21% by using the combustion gases from the first heat source 14A and the second heat source 14B. As a result, the curing efficiency can be improved by using less fuel to achieve the same curing of tobacco leaves. As it can be appreciated the above results are obtained for a certain variety of tobacco, and another variety of tobacco may lead to slightly different results. However, regardless of tobacco

TABLE 4

(using the Venturi system using LPG as fuel)

| Barn No. | Green Leaves Weight (Kg) | Dry Leaves Weight (Kg) | Dry Yield (%) | Tobacco Cure Duration (Days) | LPG Gas Usage Per Cure (Kg) | Ratio of LPG/Tobacco per Cure | Ratio of LPG/Tobacco per Cure Cumulative | LPG Gas Usage per Cure (Kg) (with Recycling Exhaust) | Ratio of LPG/Tobacco per Cure (with Recycling Exhaust) | Ratio of LPG/Tobacco per Cure (with Recycling Exhaust) Cumulative |
|---|---|---|---|---|---|---|---|---|---|---|
| 1 | 1507 | 282 | 18.71% | 6 | 247 | 0.88 | 0.88 | 247 | 0.88 | 0.88 |
| 2 | 1560 | 302 | 19.36% | 5 | 246 | 0.81 | 0.84 | 160 | 0.53 | 0.70 |
| 3 | 1460 | 263 | 18.01% | 6 | 230 | 0.87 | 0.85 | 160 | 0.61 | 0.67 |

Figure 6:
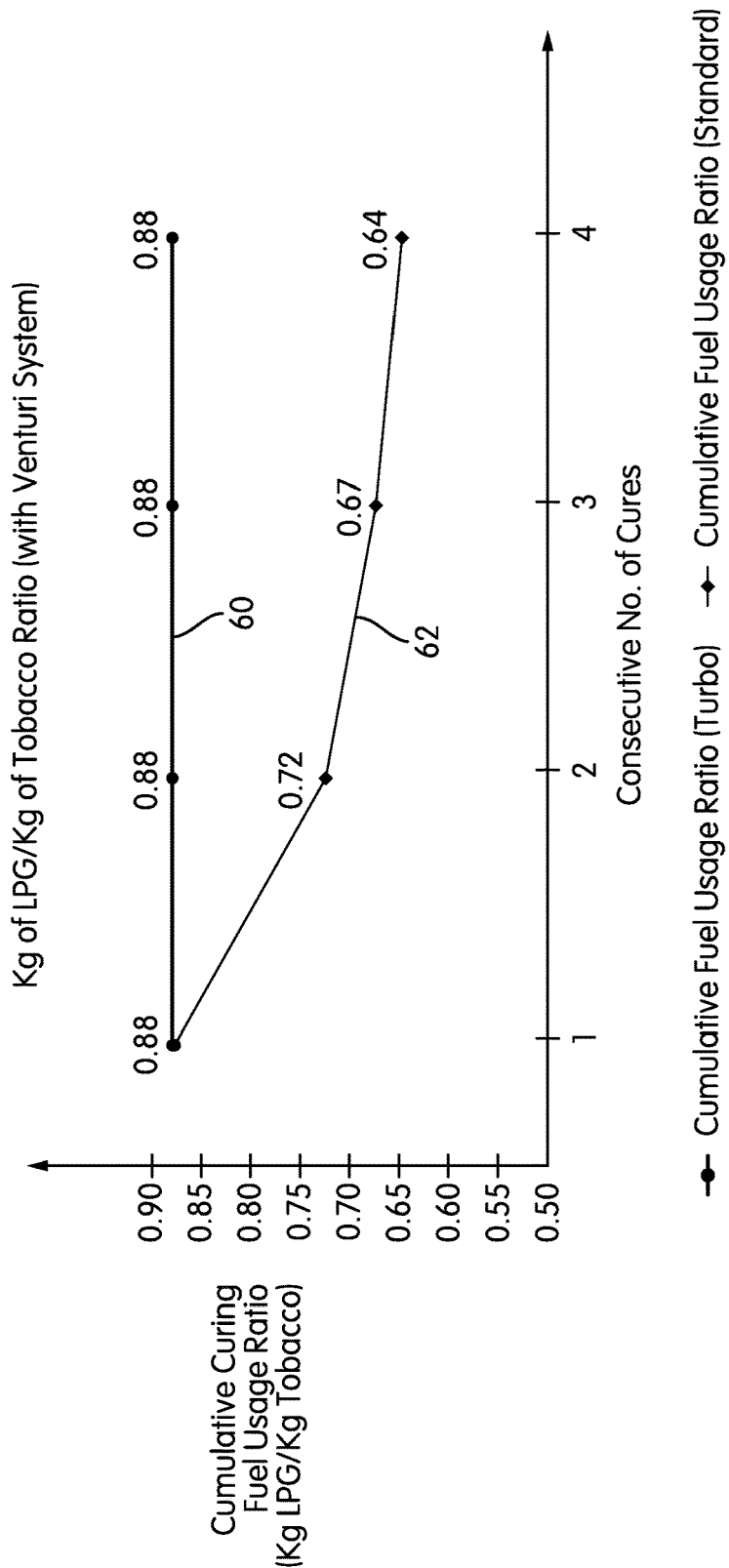
FIG. 6 is a plot of ratios of the weight of LPG to the weight of dried or cured tobacco leaves when using the barns independently and when using the barns consecutively with a circulation of combustion gases from one barn to another barn versus a number of consecutive cures, according to an embodiment of the present disclosure.

FIG. 6 is a plot of ratios of the weight of LPG to the weight of dried or cured tobacco leaves when using the barns independently and when using the barns consecutively with a recirculation of combustion gases from one barn to another barn, according to an embodiment of the present disclosure. Curve 60 represents the variation of the ratio of fuel (in this case LPG) usage to the weight of dried tobacco leaves as a function of the number of consecutive number of cures in a conventional system without recycling the combustion gases from one barn to another barn. In this case, the ratio is substantially constant and equal to approximately 0.88 as each barn uses fuel independently from the next barn and each barn uses the same amount of fuel (LPG) to dry a batch of tobacco leaves. Curve 62 represents the variation of the ratio of fuel (in this case LPG) usage to the weight of tobacco leaves as a function of the number of consecutive number of cures in a system according to an embodiment of the present disclosure in which combustion gases from one barn are used in a neighboring barn, as described in the above paragraphs. In this case, the ratio decreases from 0.88 to approximately 0.67, at the third consecutive cure, i.e., at the third barn 12C or decreases to about 0.64 at a fourth (3+1) consecutive cure, i.e, when repeating the process at the first barn 12A. As shown by the curve 62, in the first cure, the ratio is equal to 0.88. Therefore, in the first barn 12A, about 0.88 weight of LPG is used by the heat source 14A to cure the 1 batch of tobacco leaves deposited in the first barn 12A (the ratio is 0.88 to 1). However, in the second cure of the second batch deposited in the second barn 12B, the ratio decreases to 0.72 due to the utilization of the combustion gases from the first heat source 14A located in the first barn 12A to cure second batch of leaves in the second barn 12B. In other words, the full utilization of the heat source 14B in the second barn is reduced by approximately 16% by using the combustion gases from the first heat source 14A, when using LPG with a Venturi system. This allows saving energy of burning less fuel to cure the second batch of tobacco leaves. The ratio is further reduced to 0.67 when curing the third batch of tobacco leaves due to the utilization of the combustion gases from the first heat source 14A located in variety or type, the ratio of fuel usage can be decreased while achieving the desired curing and thus the overall curing efficiency can be enhanced.

Figure 7:
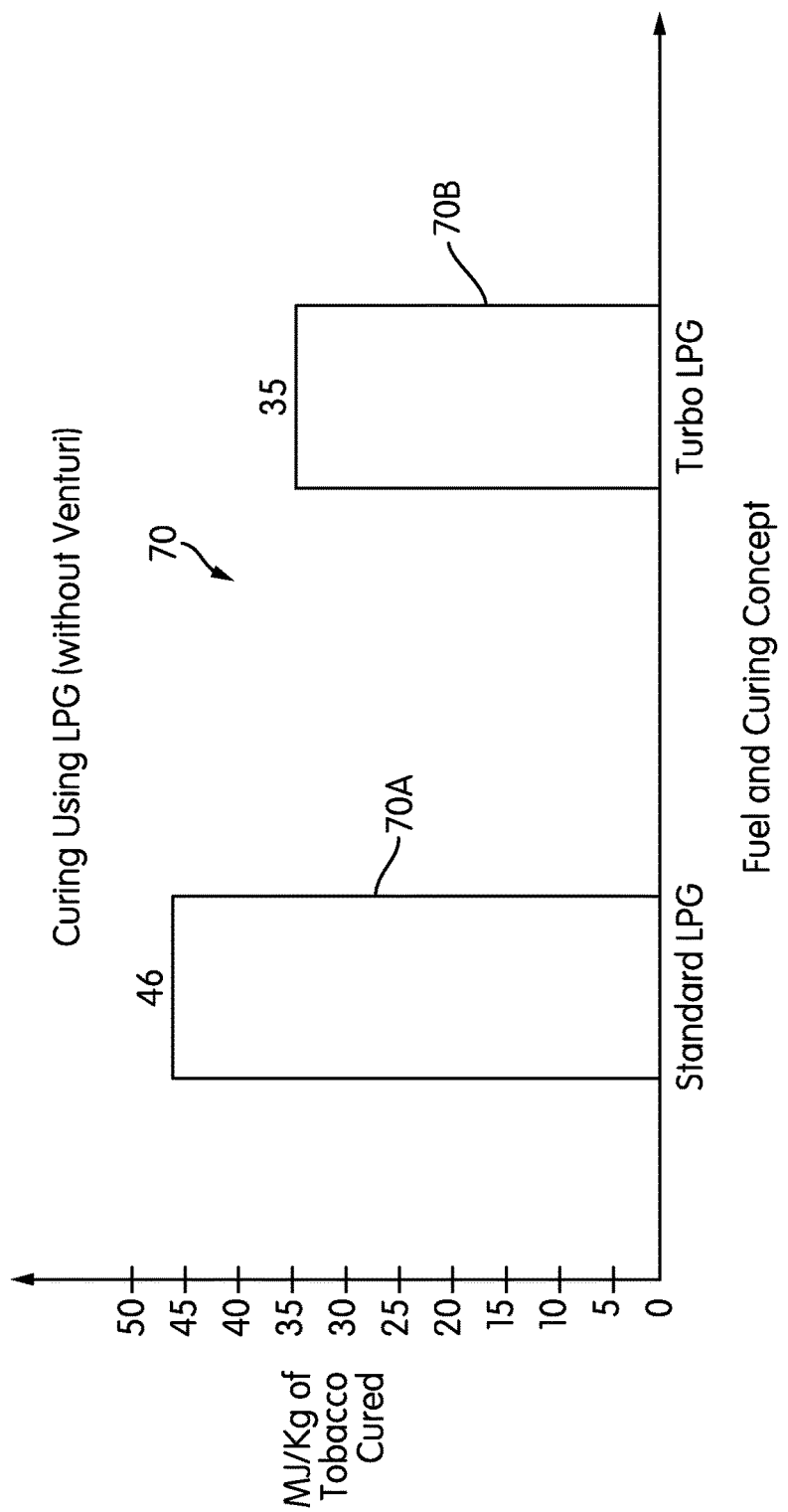
FIG. 7 is a bar-graph indicating a ratio of energy usage to weight of cured or dried tobacco leaves when using barns independently and when using the barns consecutively with a circulation of combustion gases from one barn to another barn, using LPG as a fuel source, and without using a Venturi system, according to an embodiment of the present disclosure.

FIG. 7 is a bar-graph indicating a ratio of energy usage to weight of cured or dried tobacco leaves with LPG without using a Venturi system, in accordance with an embodiment of the present disclosure. Bar graph 70 shows a plurality of bars corresponding to the ratio of energy (in MJ) to the weight of cured tobacco when using LPG as fuel without a Venturi system. Bar 70A corresponds to the ratio of LPG energy to weight of cured tobacco when using a conventional tobacco curing system with recycling the combustion gases from one barn to another barn (Standard LPG). Bar 70B corresponds to the ratio of LPG energy to weight of cured tobacco when using the system for recycling the combustion gases from one barn to another barn (Turbo LPG). As shown, the ratio decreases from about 46 to about 35 which is equivalent to energy savings of about 24%.

Figure 8:
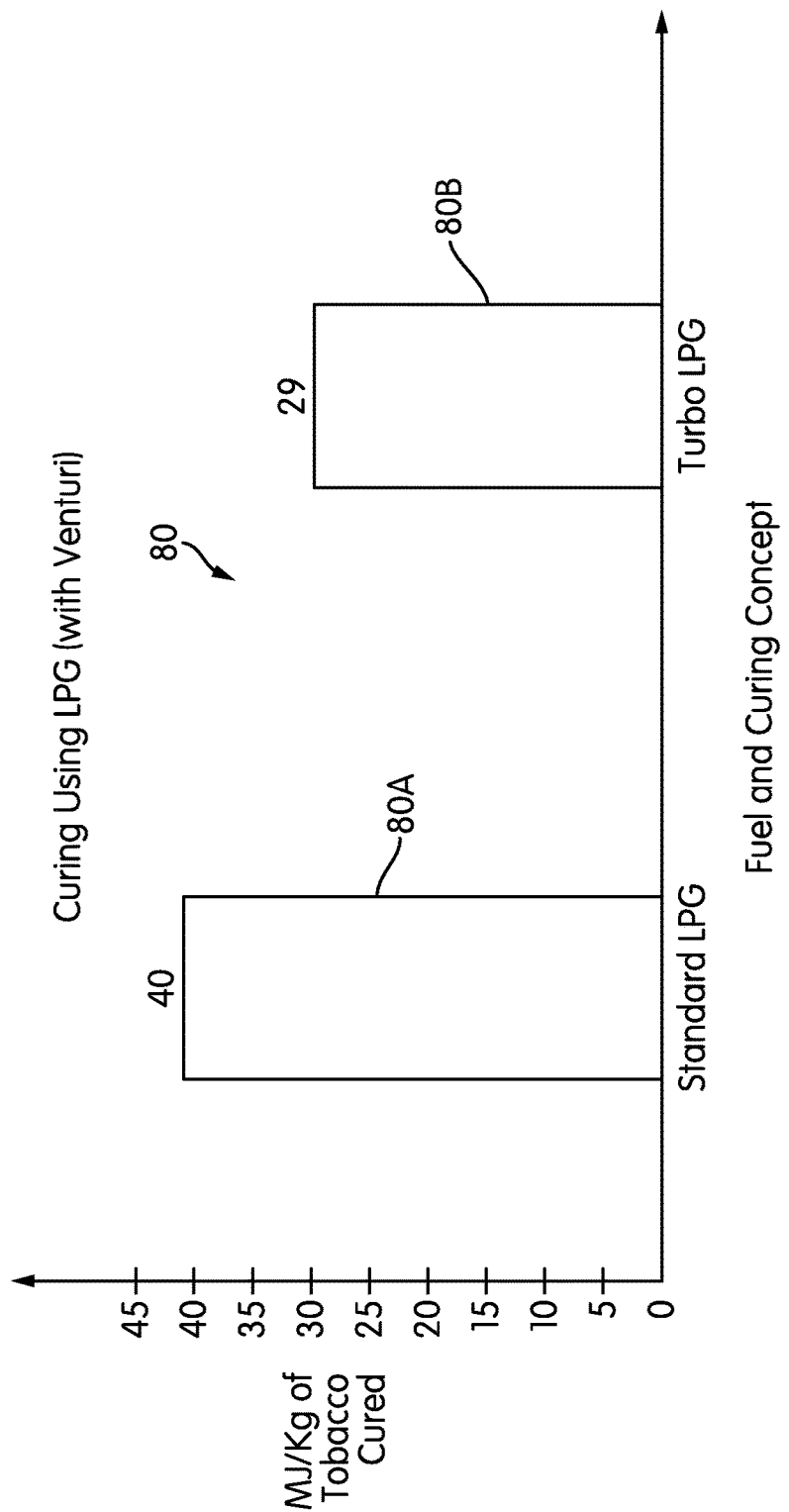
FIG. 8 is a bar-graph indicating a ratio of energy usage to weight of cured or dried tobacco leaves when using the barns independently and when using the barns consecutively with a circulation of combustion gases from one barn to another barn, using LPG as a fuel source, with a Venturi system, according to an embodiment of the present disclosure.

FIG. 8 is a bar-graph indicating a ratio of energy usage to weight of cured or dried tobacco leaves with LPG with a Venturi system, in accordance with an embodiment of the present disclosure. Bar graph 80 shows a plurality of bars corresponding to the ratio of energy (in MJ) to the weight of cured tobacco when using LPG as fuel with a Venturi system. Bar 80A corresponds to the ratio of LPG energy to weight of cured tobacco when using a conventional tobacco curing system without recycling the combustion gases from one barn to another barn (Standard LPG). Bar 80B corresponds to the ratio of LPG energy to weight of cured tobacco when using the system for recycling the combustion gases from one barn to another barn (Turbo LPG). As shown, the ratio decreases from about 40 to about 29 which is equivalent to energy savings of about 28%.

Figure 9:
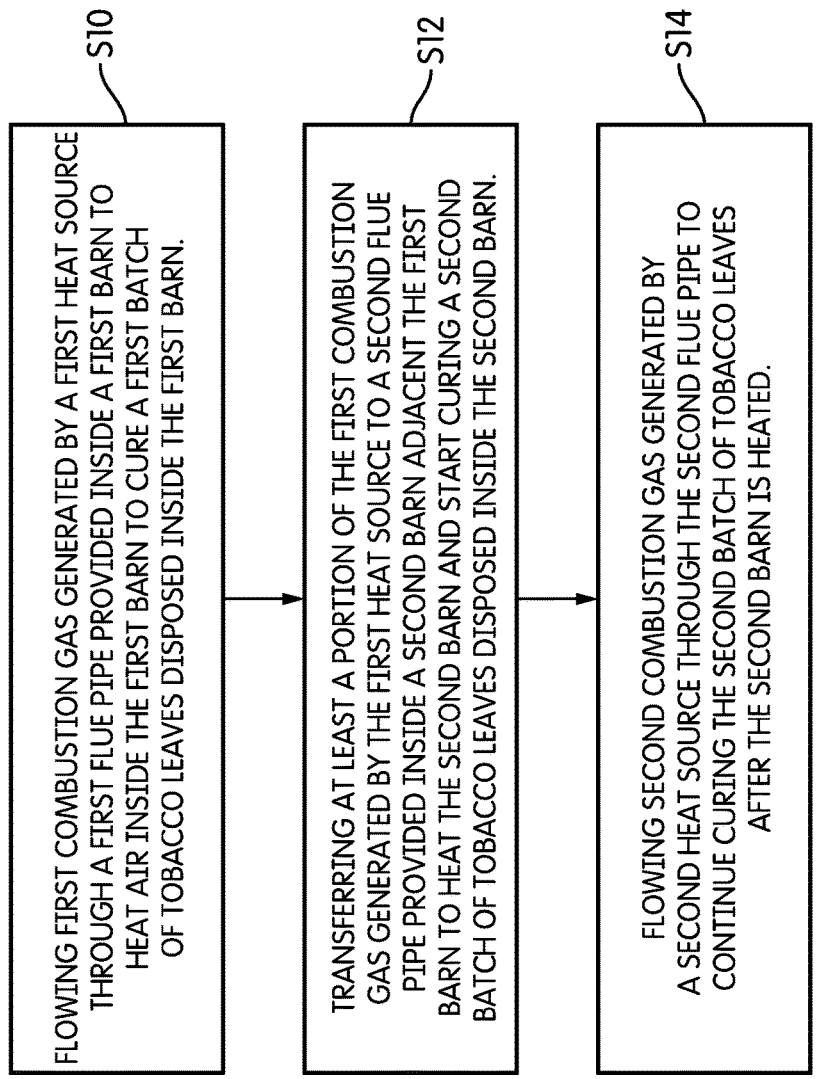
FIG. 9 depicts a flow diagram of a method for curing or drying tobacco leaves, according to an embodiment of the present disclosure.

As it can be appreciated from the above paragraphs, there is provided a method for curing or drying tobacco leaves. FIG. 9 depicts a flow diagram of a method for curing or drying tobacco leaves according to an embodiment of the present disclosure. The method includes flowing first combustion gas generated by a first heat source through a first flue pipe provided inside a first barn to heat air inside the first barn to dry a first batch of tobacco leaves disposed inside the first barn, at S10; transferring at least a portion of the first combustion gas generated by the first heat source to a second flue pipe provided inside a second barn adjacent the first barn to heat the second barn and start drying a second batch of tobacco leaves disposed inside the second barn, at S12; and flowing second combustion gas generated by a second heat source through the second flue pipe to continue drying the second batch of tobacco leaves after the second barn is heated, at S14.

In an embodiment, prior to flowing the first combustion gas through the first flue pipe, the method includes disposing the first batch of tobacco leaves inside the first barn and starting the first heat source and generating the first combustion gas by combustion of fuel in the first heat source. In an embodiment, the method includes disposing the second batch of tobacco leaves inside the second barn while the first batch of tobacco leaves is drying in the first barn.

In an embodiment, the method includes starting the second heat source and generating the second combustion gas by combustion of fuel in the second heat source. In an embodiment, prior to starting the second heat source, stopping the first heat source.

In an embodiment, transferring at least a portion of the first combustion gas generated by the first heat source to the second flue pipe includes opening a register provided between the first flue pipe and the second flue pipe.

In an embodiment, prior to flowing the second combustion gas generated by the second heat source through the second flue pipe to continue drying the second batch of tobacco leaves, the method includes transferring at least a portion of the first combustion gas generated by the first heat source to a third flue pipe provided inside a third barn adjacent to the second barn to heat the third barn and start drying a third batch of tobacco leaves disposed inside the third barn. In an embodiment, transferring at least a portion of the first combustion gas generated by the first heat source to the third flue pipe includes opening a register provided between the second flue pipe and the third flue pipe.

In an embodiment, after flowing the second combustion gas generated by the second heat source through the second flue pipe to continue drying the second batch of tobacco leaves, flowing the second combustion gas generated by the second heat source through the third flue pipe to continue drying the third batch of tobacco leaves. The method further includes flowing third combustion gas generated by a third heat source provided in the third barn through the third flue pipe to continue drying the third batch of tobacco leaves. In an embodiment, when using a fan, the method includes flowing third combustion gases back to the first barn to start the curing process in the first barn.

As it can be appreciated from the above description, the present system and method of reusing combustion gases from one barn into another barn increases the overall tobacco leaves drying efficiency and provides energy savings regardless of the type of fuel used.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed:

1. A system for curing or drying tobacco leaves comprising:
   a first barn configured for housing tobacco leaves, the first barn comprising a first heat source and a first flue pipe for transporting first combustion gases generated by a combustion of fuel in the first heat source, the first flue pipe carrying the first combustion gases being configured to heat air inside the first barn to dry or cure the tobacco leaves housed inside the first barn;
   a second barn configured for housing tobacco leaves, the second barn comprising a second heat source and a second flue pipe for transporting second combustion gases generated by a combustion of fuel in the second heat source, the second flue pipe carrying the second combustion gases being configured to heat air inside the second barn to dry or cure the tobacco leaves housed inside the second barn; and
   a connecting flue pipe configured and arranged to connect the first flue pipe inside the first barn to the second flue pipe inside the second barn, wherein the connecting flue pipe is configured to transfer at least a portion of the first combustion gases generated by the first heat source into the second flue pipe to heat the air inside the second barn prior to combustion of fuel in the second heat source.

2. The system according to claim 1, wherein the first heat source, the second heat source or both use wood, biomass, coal, liquefied petroleum gas (LPG), liquid natural gas (LNG), gasoline, alcohol, any combination of two or more thereof, or any other suitable fuel.

3. The system according to claim 1, wherein the first heat source, or the second heat source or both comprise a Venturi system when using liquefied petroleum gas, liquid natural gas, or any other suitable fuel.

4. The system according to claim 1, wherein the first barn and the second barn are adjacent to each other and share a common wall.

5. The system according to claim 1, further comprising a register or damper disposed between the first flue pipe and the connecting flue pipe to control a flow of the first combustion gases from the first flue pipe to the connecting flue pipe.

6. The system according to claim 1, further comprising a first bypass flue pipe disposed inside the first barn, the bypass flue pipe being configured and arranged to bypass the first flue pipe and transport the first combustion gases from the first heat source to the second flue pipe inside the second barn.

7. The system according to claim 1, further comprising a return flue pipe connected to the first heat source and a fan connected to the return flue pipe, the fan and the return flue pipe being configured and arranged to recycle or return at least a portion of the first combustion gases generated by the first heat source and transferred to the second flue pipe back into the first heat source.

8. The system according to claim 1, further comprising a third barn configured for housing tobacco leaves, the third barn comprising a third heat source and a third flue pipe for transporting third combustion gases generated by a combustion of fuel in the third heat source, the third flue pipe carrying the third combustion gases being configured to heat air inside the third barn to dry or cure the tobacco leaves housed inside the third barn; and a second connecting flue pipe configured and arranged to connect the second flue pipe inside the second barn to the third flue pipe inside the third barn, wherein the second connecting flue pipe is configured to transfer at least a portion of the first combustion gases generated by the first heat source or at least a portion of the second combustion gases generated by the second heat source into the third flue pipe to heat the air inside the third barn prior to combustion of fuel in the third heat source.

9. The system according to claim 8, further comprising a register or damper disposed between the second flue pipe and the second connecting flue pipe to control a flow of the second combustion gases from the second flue pipe to the second connecting flue pipe.

10. The system according to claim 8, further comprising a second bypass flue pipe disposed inside the second barn, the second bypass flue pipe being configured and arranged to bypass the second flue pipe and transport the first combustion gases from the first heat source or the second combustion gases from the second heat source to the third flue pipe inside the third barn.

11. The system according to claim 8, further comprising a second return flue pipe connected to the second heat source and a fan connected to the second return flue pipe, the fan and the second return flue pipe being configured and arranged to recycle or return at least a portion of the first combustion gases generated by the first heat source or a portion of the second combustion gases generated by the second heat source and transferred to the third flue pipe back to the first heat source or back to the second heat source.

12. A method for curing or drying tobacco leaves comprising:

flowing first combustion gas generated by a first heat source through a first flue pipe provided inside a first barn to heat air inside the first barn to dry a first batch of tobacco leaves disposed inside the first barn;

transferring at least a portion of the first combustion gas generated by the first heat source to a second flue pipe provided inside a second barn adjacent the first barn to heat the second barn and start drying a second batch of tobacco leaves disposed inside the second barn; and flowing second combustion gas generated by a second heat source through the second flue pipe to continue drying the second batch of tobacco leaves after the second barn is heated.

13. The method according to claim 12, further comprising prior to flowing the first combustion gas through the first flue pipe, disposing the first batch of tobacco leaves inside the first barn and starting the first heat source and generating the first combustion gas by combustion of fuel in the first heat source.

14. The method according to claim 12, further comprising disposing the second batch of tobacco leaves inside the second barn while the first batch of tobacco leaves is drying in the first barn.

15. The method according to claim 12, further comprising starting the second heat source and generating the second combustion gas by combustion of fuel in the second heat source.

16. The method according to claim 15, wherein prior to starting the second heat source, stopping the first heat source.

17. The method according to claim 12, wherein transferring at least a portion of the first combustion gas generated by the first heat source to the second flue pipe comprises opening a register provided between the first flue pipe and the second flue pipe.

18. The method according to claim 12, further comprising:

prior to flowing the second combustion gas generated by the second heat source through the second flue pipe to continue drying the second batch of tobacco leaves, transferring at least a portion of the first combustion gas generated by the first heat source to a third flue pipe provided inside a third barn adjacent to the second barn to heat the third barn and start drying a third batch of tobacco leaves disposed inside the third barn.

19. The method according to claim 18, wherein transferring at least a portion of the first combustion gas generated by the first heat source to the third flue pipe comprises opening a register provided between the second flue pipe and the third flue pipe.

20. The method according to claim 18, further comprising:

after flowing the second combustion gas generated by the second heat source through the second flue pipe to continue drying the second batch of tobacco leaves, flowing the second combustion gas generated by the second heat source through the third flue pipe to continue drying the third batch of tobacco leaves.

21. The method according to claim 20, further comprising flowing third combustion gas generated by a third heat source provided in the third barn through the third flue pipe to continue drying the third batch of tobacco leaves.

\* \* \* \* \*